United States Patent
Damnjanovic et al.

(10) Patent No.: US 11,431,459 B2
(45) Date of Patent: Aug. 30, 2022

(54) GROUP ACK/NACK FOR LTE IN UNLICENSED SPECTRUM

(71) Applicant: QUALCOMM Incorporated, San Diego, CA (US)

(72) Inventors: Aleksandar Damnjanovic, Del Mar, CA (US); Naga Bhushan, San Diego, CA (US); Wanshi Chen, San Diego, CA (US); Durga Prasad Malladi, San Diego, CA (US); Tingfang Ji, San Diego, CA (US); Tao Luo, San Diego, CA (US); Yongbin Wei, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 733 days.

(21) Appl. No.: 14/456,880

(22) Filed: Aug. 11, 2014

(65) Prior Publication Data

US 2015/0049709 A1  Feb. 19, 2015

Related U.S. Application Data

(60) Provisional application No. 61/865,497, filed on Aug. 13, 2013.

(51) Int. Cl.
*H04L 5/00* (2006.01)
*H04W 16/14* (2009.01)
(Continued)

(52) U.S. Cl.
CPC ........... *H04L 5/0055* (2013.01); *H04W 16/14* (2013.01); *H04W 74/0816* (2013.01); *H04L 1/1614* (2013.01); *H04L 1/1621* (2013.01)

(58) Field of Classification Search
CPC ............. H04L 5/0053; H04L 1/1854; H04L 1/1835; H04L 1/1812; H04L 1/1829; H04L 1/1874; H04W 28/06
See application file for complete search history.

(56) References Cited

U.S. PATENT DOCUMENTS

2008/0232335 A1   9/2008  Del et al.
2008/0253326 A1  10/2008  Damnjanovic
(Continued)

FOREIGN PATENT DOCUMENTS

CN   WO 2013166689 A1 * 11/2013 ............ H04W 28/06
JP         2004343567 A    12/2004
(Continued)

OTHER PUBLICATIONS

Radio-Electronics.com, LTE Frame and Subframe Structure, May 18, 2013, http://www.radio-electronics.com/info/cellulartelecomms/lte-long-term-evolution/lte-frame-subframe-structure.php.*
(Continued)

*Primary Examiner* — Ajit Patel
(74) *Attorney, Agent, or Firm* — Liem T. Do

(57) ABSTRACT

Methods, systems, devices, and apparatuses are described for wireless communications. In one method, a set of one or more data subframes of a data frame may be transmitted over an unlicensed spectrum, to a user equipment (UE), during a transmission period. A group hybrid automatic repeat request (HARQ) feedback message for a plurality of data subframes including at least one of the data subframes in the set of one or more data subframes may then be received over the unlicensed spectrum, from the UE, during the transmission period. In another method, a set of one or more data subframes of a data frame may be received over an unlicensed spectrum during a transmission period. A group HARQ feedback message for a plurality of data subframes including at least one of the data subframes in the
(Continued)

set of one or more data subframes may then be transmitted over the unlicensed spectrum during the transmission period.

28 Claims, 19 Drawing Sheets

(51) Int. Cl.
*H04W 74/08* (2009.01)
*H04L 1/16* (2006.01)

(56) References Cited

U.S. PATENT DOCUMENTS

| | | | |
|---|---|---|---|
| 2010/0284393 A1 | 11/2010 | Abraham et al. | |
| 2011/0141901 A1* | 6/2011 | Luo | H04L 1/1822 370/241 |
| 2012/0077510 A1* | 3/2012 | Chen | H04W 28/26 455/452.1 |
| 2012/0327915 A1* | 12/2012 | Kang | H04L 5/0007 370/336 |
| 2013/0148640 A1* | 6/2013 | Li | H04L 1/1854 370/338 |
| 2013/0163576 A1 | 6/2013 | Wang et al. | |
| 2013/0294356 A1* | 11/2013 | Bala | H04W 16/14 370/329 |
| 2013/0315114 A1* | 11/2013 | Seo | H04L 5/001 370/280 |
| 2014/0031054 A1* | 1/2014 | Zou | H04W 16/14 455/452.2 |
| 2015/0319753 A1* | 11/2015 | Chen | G01N 33/57446 370/277 |
| 2016/0073391 A1* | 3/2016 | Awad | H04L 1/1822 370/329 |
| 2016/0234717 A1 | 8/2016 | Sugaya | |

FOREIGN PATENT DOCUMENTS

| | | |
|---|---|---|
| WO | WO-2008128204 A1 | 10/2008 |
| WO | WO-2012078565 A1 | 6/2012 |
| WO | WO-2012109195 A2 | 8/2012 |

OTHER PUBLICATIONS

ISA/EPO, International Search Report and Written Opinion of the International Searching Authority, Int'l. App. No. PCT/US2014/050706, dated Oct. 20, 2014, European Patent Office, Rijswijk, NL, 13 pgs.

Zhao et al., "A Cognitive Based Spectrum Sharing Scheme for LTE Advanced Systems," 2010 International Congress on Ultra Modern Telecommunications and Control Systems and Workshops (ICUMT), Oct. 18-20, 2010, pp. 965-969, Moscow, RU, ISBN 978-1-4244-7285-7, IEEE.

Catt: "Considerations on D2D Communication," 3GPP TSG RAN WG1 Meeting #74, R1-133030, 3rd Generation Partnership Project (3GPP), Mobile Competence Centre, 650, Route Des Lucioles, F-06921, Sophia-Antipolis Cedex, France, vol. RAN WG1, No. Barcelona, Spain, Aug. 19-23, 2013, Aug. 10, 2013 (Aug. 10, 2013), XP050716259, 6 pages, Retrieved from the Internet: URL: http://www.3gpp.org/ftp/tsg_ran/WG1_RL1/TSGR1_74/Docs/[retrieved on Aug. 10, 2013].

Intel Corporation: "On D2D Communication Design Aspects in Public Safety Scenarios", 3GPP Draft, 3GPP TSG RAN WG1 Meeting #74, R1-132940—Intel—D2D Comm, 3rd Generation Partnership Project (3GPP), Mobile Competence Centre, 650, Route Des Lucioles, F-06921, Sophia-Antipolis Cedex, France, vol. RAN WG1, No. Barcelona, Spain; Aug. 19-23, 2013, Aug. 10, 2013 (Aug. 10, 2013), pp. 1-9, XP050716179, Retrieved from the Internet: URL: http://www.3gpp.org/ftp/tsg_ran/WG1_RL1/TSGR1_74/Docs/, [retrieved on Aug. 10, 2013].

* cited by examiner

GROUP ACK/NACK FOR LTE IN UNLICENSED SPECTRUM

CROSS REFERENCES

The present Application for Patent claims priority to U.S. Provisional Patent Application No. 61/865,497 by Damnjanovic et al., entitled "Group ACK/NACK for LTE in Unlicensed Spectrum," filed Aug. 13, 2013, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more congested, operators are beginning to look at ways to increase capacity. One approach may include the use of WLANs to offload some of the traffic and/or signaling of a cellular network. WLANs (or WiFi networks) are attractive because, unlike cellular networks that operate in a licensed spectrum, WiFi networks generally operate in an unlicensed spectrum. However, the use of unlicensed spectrum by both cellular and WiFi devices may require the use of a contention-based protocol to gain access to the unlicensed spectrum. Thus, devices wanting to communicate over the unlicensed spectrum may not be able to capture the unlicensed spectrum over consecutive data frames, and techniques to maximize the use of (e.g., reduce the overhead associated with) those data frames that are captured may be useful.

SUMMARY

The described features generally relate to one or more improved methods, systems, devices, and/or apparatuses for wireless communications. More particularly, the described features relate to the transmission of data frames including data subframes, and the transmission of group hybrid automatic repeat request (HARQ) feedback messages for groups of the data subframes (i.e., messages containing HARQ feedback information for groups of data subframes).

In a first set of illustrative examples, a method for wireless communications is described. In one configuration, a set of one or more data subframes of a data frame may be transmitted over an unlicensed spectrum, to a UE, during a transmission period. A group HARQ feedback message for a plurality of data subframes including at least one of the data subframes in the set of one or more data subframes may then be received over the unlicensed spectrum, from the UE, during the transmission period.

In some examples, the group HARQ feedback message may include an acknowledgment for each of the plurality of data subframes decoded by the UE. The group HARQ feedback message may be received either periodically or in response to a trigger. In some examples, the group HARQ feedback message may include a bitmap that indicates, based on a position in the bitmap, a process identifier for each of the plurality of data subframes being acknowledged by the UE in the group HARQ feedback message. In yet further example, receiving the group HARQ feedback message for the plurality of data subframes may include receiving the group HARQ feedback message after a downlink portion of the transmission period.

In one example, the method may further include transmitting, over the unlicensed spectrum to the UE, a Request to Send message. The method may also include receiving, over the unlicensed spectrum from the UE, a Clear to Send message to reserve an uplink portion of the transmission period to receive the group HARQ feedback message from the UE. In some examples, the group HARQ feedback message may include HARQ feedback information for a subset of the set of one or more data subframes, and the method may further include receiving, over the unlicensed spectrum from the UE, a next group HARQ feedback message including HARQ feedback information for a remaining subset of the set of one or more data subframes. The next group HARQ feedback message may be received during a next transmission period.

Additionally or alternatively, the method may include performing clear channel assessment (CCA) to determine availability of the unlicensed spectrum, and accessing the unlicensed spectrum during the transmission period when a determination is made that the unlicensed spectrum is available. The method may also include transmitting, after the transmission period, an uplink grant to the UE over the unlicensed spectrum. The group HARQ feedback message may be received in response to the uplink grant. Additionally or alternatively, the method may comprise transmitting a CTS signal when the unlicensed spectrum is available.

In a second set of illustrative examples, an apparatus for wireless communications is also described. In one configuration, the apparatus may include a processor and memory communicatively coupled to the processor. The processor may be configured to transmit, over an unlicensed spectrum to a UE, during a transmission period, a set of one or more data subframes of a data frame. The processor may be further configured to receive, over the unlicensed spectrum from the UE, during the transmission period, a group HARQ feedback message for a plurality of data subframes including at least one of the data subframes in the set of one or more data subframes. In certain examples, the apparatus may implement one or more aspects of the method for wireless communications described above with respect to the first set of illustrative embodiments.

In a third set of illustrative examples, another method for wireless communications is described. In one configuration, a set of one or more data subframes of a data frame may be received over an unlicensed spectrum during a transmission period. A group HARQ feedback message for a plurality of data subframes including at least one of the data subframes in the set of one or more data subframes may then be transmitted over the unlicensed spectrum during the transmission period.

In some examples, the method may include identifying which data subframes are correctly decoded after reception, and the group HARQ feedback message may include an acknowledgement for each of the plurality of data subframes correctly decoded. The group HARQ feedback message may be transmitted, over the unlicensed spectrum, either periodically or in response to a trigger. In one example, the method may include identifying which data subframes are correctly decoded after reception, and the group HARQ feedback message may include a bitmap that indicates, based on a position in the bitmap, a process identifier for each of the plurality of data subframes correctly decoded. In some examples, transmitting the group HARQ feedback message for the plurality of data subframes may include transmitting the group HARQ feedback message after a downlink portion of the transmission period.

Additionally or alternatively, the method may include receiving, over the unlicensed spectrum, a Request to Send message, and transmitting, over the unlicensed spectrum, a Clear to Send message to reserve an uplink portion of the transmission period to transmit the group HARQ feedback message. In some embodiments, the group HARQ feedback message may include HARQ feedback information for a subset of the set of one or more data subframes, and the method may include transmitting, over the unlicensed spectrum, a next group HARQ feedback message comprising HARQ feedback information for a remaining subset of the set of one or more data subframes. In such example, the next group HARQ feedback message may be transmitted during a next transmission period. In one example, the method may include receiving, after the transmission period, an uplink grant over the unlicensed spectrum. The group HARQ feedback message may be transmitted in response to the uplink grant.

In a fourth set of illustrative examples, an apparatus for wireless communications is described. In one configuration, the apparatus may include a processor and memory communicatively coupled to the processor. The processor may be configured to receive, over an unlicensed spectrum, during a transmission period, a set of one or more data subframes of a data frame. The processor may be further configured to transmit, over the unlicensed spectrum, during the transmission period, a group HARQ feedback message for a plurality of data subframes including at least one of the data subframes in the set of one or more data subframes. In certain examples, the apparatus may implement one or more aspects of the method for wireless communications described above with respect to the third set of illustrative embodiments.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
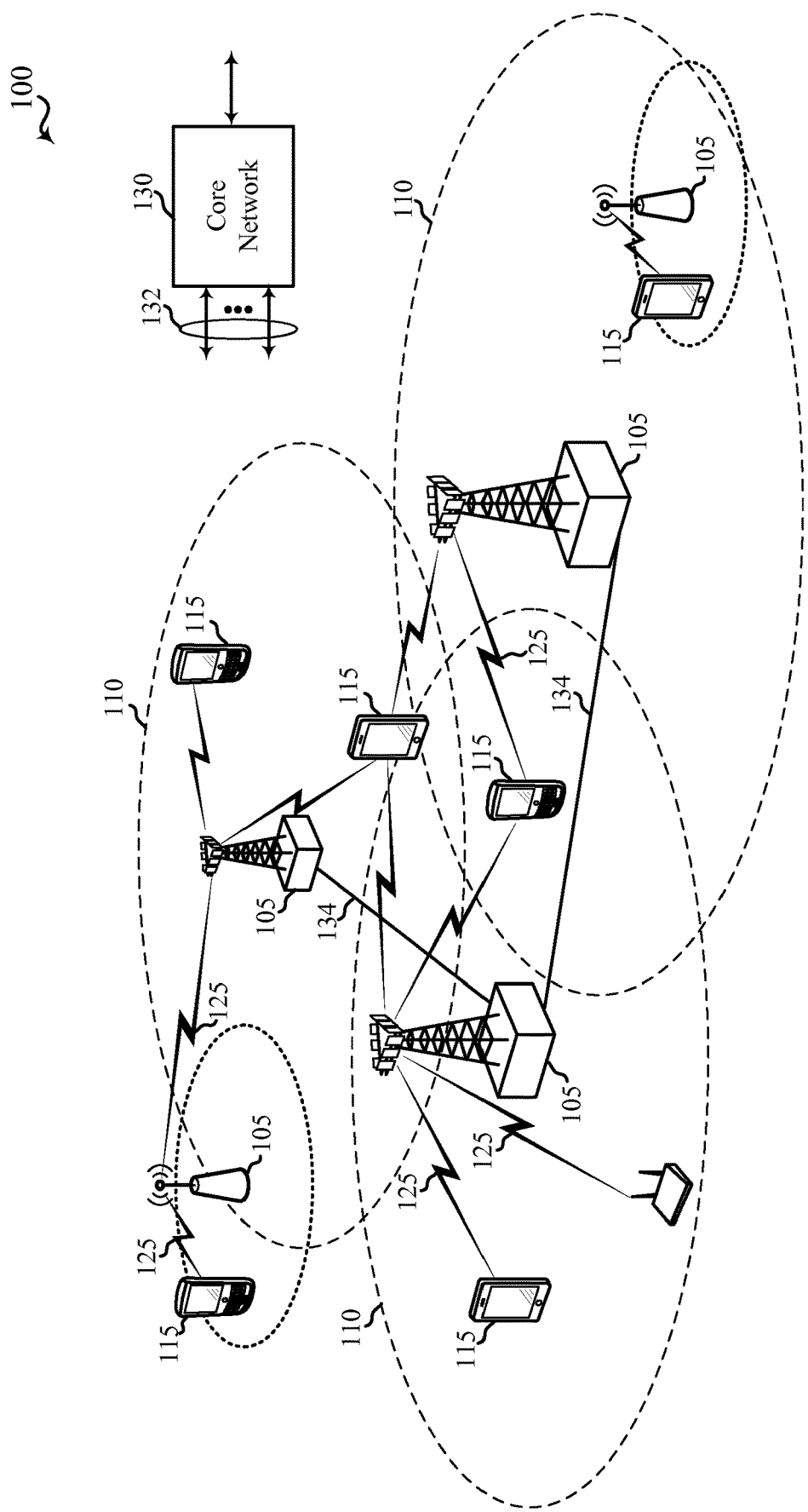
FIG. 1 shows a block diagram of a wireless communications system.

Methods, systems, and apparatuses are described in which unlicensed spectrum is used for LTE communications. Generally, operators have looked at WiFi as the primary mechanism to use unlicensed spectrum to relieve ever increasing levels of congestion in cellular networks. However, a new carrier type (NCT) based on LTE in an unlicensed or shared spectrum may be compatible with carrier-grade WiFi, which makes LTE/LTE-A communications in an unlicensed or shared spectrum an alternative to WiFi solutions directed at relieving network congestion. LTE/LTE-A communications in an unlicensed or shared spectrum may leverage many LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some cases, LTE/LTE-A in an unlicensed or shared spectrum may perform significantly better than WiFi. For example, when an all LTE/LTE-A in an unlicensed or shared spectrum deployment (for single or multiple operators) is compared to an all WiFi deployment, or when there are dense small cell deployments, LTE/LTE-A in an unlicensed or shared spectrum may perform significantly better than WiFi. LTE/LTE-A in an unlicensed or shared spectrum may also perform better than WiFi in other cases such as when LTE/LTE-A in an unlicensed or shared spectrum is mixed with WiFi (for single or multiple operators).

The described features relate to the transmission of data frames including data subframes, and the transmission of group HARQ feedback messages for groups of the data subframes. In a wireless communications system in which devices have to contend for access to a spectrum (e.g., an unlicensed spectrum or shared spectrum), it may be desirable to maximize the use of data frames of the spectrum to which a device gains access (or captures). This may be done, in some respects, by grouping HARQ feedback messages into a group HARQ feedback message (i.e., a message containing HARQ feedback information for a group of data subframes). A group HARQ feedback message may include HARQ feedback for a plurality of data subframes in one or multiple data subframes, and may be transmitted in a same or different data frame as the data subframes with which it is associated. The use of a group HARQ feedback message may, for example, minimize ACK/NACK overhead, maximize an uplink transmission budget, and/or minimize the requirements on soft buffers.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes a plurality of access points (e.g., base stations, eNBs, or WLAN access points) 105, a number of user equipments (UEs) 115, and a core network 130. Some of the access points 105 may communicate with the UEs 115 under the control of a base station controller (not shown), which may be part of the core network 130 or certain access points 105 (e.g., base stations or eNBs) in various embodiments. Some of the access points 105 may communicate control information and/or user data with the core network 130 through backhaul 132. In some embodiments, some of the access points 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 may provide communication coverage for a respective coverage area 110. In some embodiments, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for an access point may be divided into sectors making up only a portion of the coverage area (not shown). The system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some embodiments, the system 100 may include an LTE/LTE-A communications system (or network) that supports one or more modes of operation or deployment scenarios in an unlicensed or shared spectrum. In other embodiments, the system 100 may support wireless communications using an unlicensed spectrum and an access technology different from LTE/LTE-A in a license, unlicensed or shared spectrum, or a licensed spectrum. In LTE/LTE-A communications systems, the term evolved NodeB or eNB may be generally used to describe of the access points 105. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions. The downlink transmissions may be made using a licensed spectrum (e.g., LTE), LTE/LTE-A in an unlicensed or shared spectrum, or both. Similarly, the uplink transmissions may be made using a licensed spectrum (e.g., LTE), LTE/LTE-A in an unlicensed or shared spectrum, or both.

In some embodiments of the system 100, various deployment scenarios for LTE/LTE-A in an unlicensed or shared spectrum may be supported including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations or eNBs 105 as well as UEs 115 may support one or more of these or similar modes of operation. OFDMA communications signals may be used in the communications links 125 for LTE downlink transmissions in an unlicensed and/or a licensed spectrum, while SC-FDMA communications signals may be used in the communications links 125 for LTE uplink transmissions in an unlicensed and/or a licensed spectrum. Additional details regarding the implementation of LTE/LTE-A in an unlicensed or shared spectrum deployment scenarios or modes of operation in a system such as the system 100, as well as other features and functions related to the operation of LTE/LTE-A in an unlicensed or shared spectrum, are provided below with reference to FIGS. 2-16.

Figure 2A:
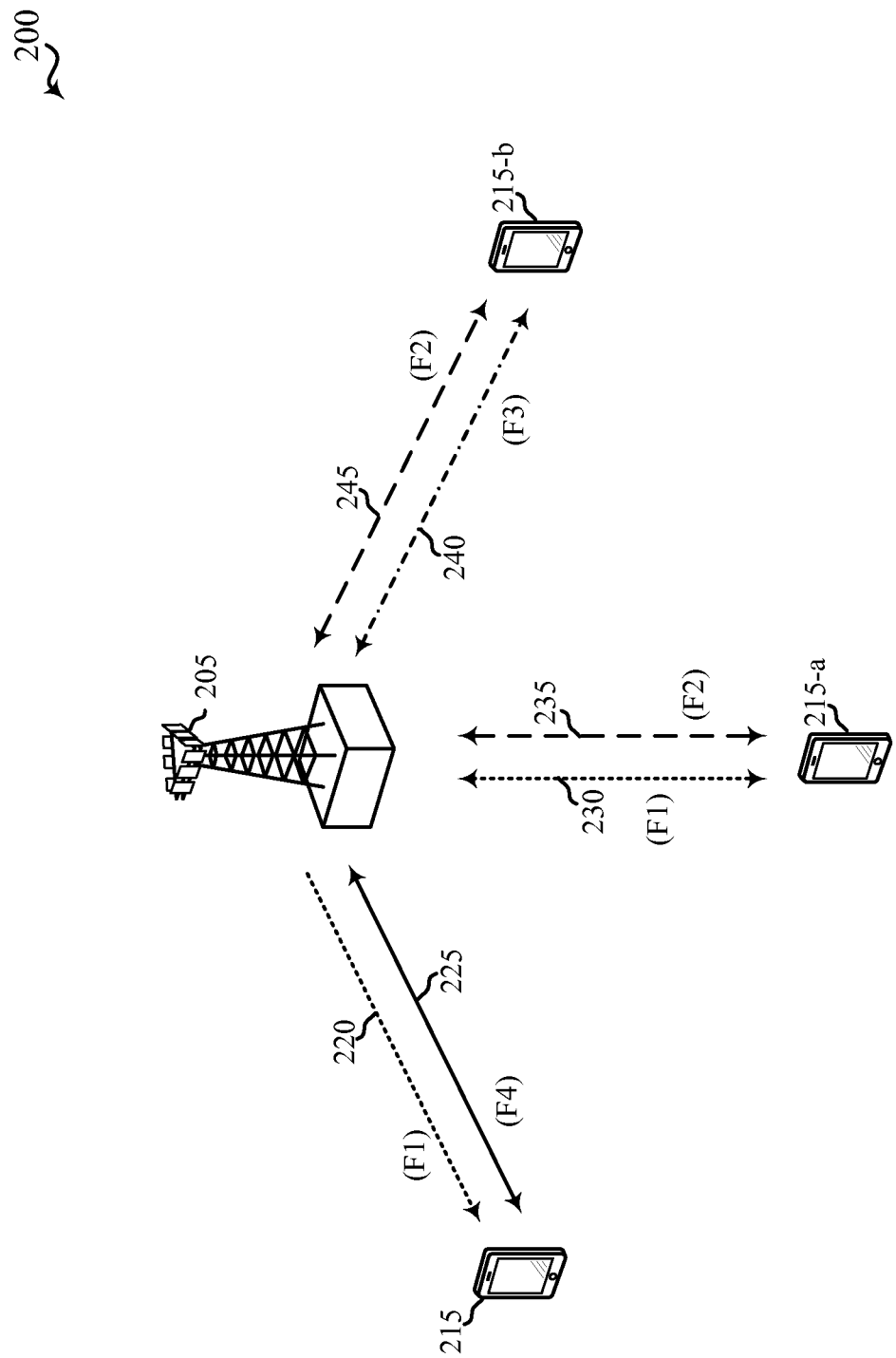
FIG. 2A shows a diagram that illustrates examples of deployment scenarios for using long term evolution (LTE) in an unlicensed spectrum according to various embodiments.

Turning next to FIG. 2A, a wireless communications system 200 illustrates examples of a supplemental downlink mode and of a carrier aggregation mode for an LTE network that supports LTE/LTE-A in an unlicensed or shared spectrum. The system 200 may be an example of portions of the system 100 of FIG. 1. Moreover, the base station 205 may be an example of the base stations 105 of FIG. 1, while the UEs 215, 215-a, and 215-b may be examples of the UEs 115 of FIG. 1.

In the example of a supplemental downlink mode in the system 200, the base station 205 may transmit OFDMA communications signals to a UE 215 using a downlink 220. The downlink 220 is associated with a frequency F1 in an unlicensed spectrum. The base station 205 may transmit OFDMA communications signals to the same UE 215 using a bidirectional link 225 and may receive SC-FDMA communications signals from that UE 215 using the bidirectional link 225. The bidirectional link 225 is associated with a frequency F4 in a licensed spectrum. The downlink 220 in the unlicensed spectrum and the bidirectional link 225 in the licensed spectrum may operate concurrently. The downlink 220 may provide a downlink capacity offload for the base station 205. In some embodiments, the downlink 220 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in the system 200, the base station 205 may transmit OFDMA communications signals to a UE 215-a using a bidirectional link 230 and may receive SC-FDMA communications signals from the same UE 215-a using the bidirectional link 230. The bidirectional link 230 is associated with the frequency F1 in the unlicensed spectrum. The base station 205 may also transmit OFDMA communications signals to the same UE 215-a using a bidirectional link 235 and may receive SC-FDMA communications signals from the same UE 215-a using the bidirectional link 235. The bidirectional link 235 is associated with a frequency F2 in a licensed spectrum. The bidirectional link 230 may provide a downlink and uplink capacity offload for the base station 205. Like the supplemental downlink described above, this scenario may occur with any service provider (e.g., MNO) that uses a licensed spectrum and needs to relieve some of the traffic and/or signaling congestion.

In another example of a carrier aggregation mode in the system 200, the base station 205 may transmit OFDMA communications signals to a UE 215-b using a bidirectional link 240 and may receive SC-FDMA communications signals from the same UE 215-b using the bidirectional link 240. The bidirectional link 240 is associated with a frequency F3 in an unlicensed spectrum. The base station 205 may also transmit OFDMA communications signals to the same UE 215-b using a bidirectional link 245 and may receive SC-FDMA communications signals from the same UE 215-b using the bidirectional link 245. The bidirectional link 245 is associated with the frequency F2 in the licensed spectrum. The bidirectional link 240 may provide a downlink and uplink capacity offload for the base station 205. This example and those provided above are presented for illustrative purposes and there may be other similar modes of operation or deployment scenarios that combine LTE and LTE/LTE-A in an unlicensed or shared spectrum for capacity offload.

As described above, the typical service provider that may benefit from the capacity offload offered by using LTE/LTE-A in an unlicensed or shared spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE/LTE-A in an unlicensed or shared spectrum secondary component carrier (SCC) on the unlicensed spectrum.

In the carrier aggregation mode, data and control may generally be communicated in LTE (e.g., bidirectional links 225, 235, and 245) while data may generally be communicated in LTE/LTE-A in an unlicensed or shared spectrum (e.g., bidirectional links 230 and 240). The carrier aggregation mechanisms supported when using LTE/LTE-A in an unlicensed or shared spectrum may fall under a hybrid frequency division duplexing-time division duplexing (FDD-TDD) carrier aggregation or a TDD-TDD carrier aggregation with different symmetry across component carriers.

Figure 2B:
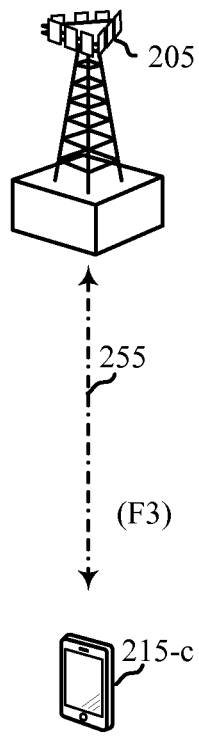
FIG. 2B shows a diagram that illustrates an example of a standalone mode using LTE in an unlicensed spectrum according to various embodiments.

FIG. 2B shows a wireless communications system 250 that illustrates an example of a standalone mode for LTE/LTE-A in an unlicensed or shared spectrum. The system 250 may be an example of portions of the system 100 of FIG. 1. Moreover, the base station 205 may be an example of the base stations 105 and/or 205 described with reference to FIG. 1 and/or 2A, while the UE 215-c may be an example of the UEs 115 and/or 215 of FIGS. 1 and/or 2A.

In the example of a standalone mode in system 250, the base station 205 may transmit OFDMA communications signals to the UE 215-c using a bidirectional link 255 and may receive SC-FDMA communications signals from the UE 215-c using the bidirectional link 255. The bidirectional link 255 may be associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event host, hotel, enterprise, or large corporation that does not have licensed spectrum.

In some embodiments, a transmitting device such as an eNB 105 and/or 205 described with reference to FIGS. 1, 2A, and/or 2B, or a UE 115 and/or 215 described with reference to FIGS. 1, 2A, and/or 2B, may use a gating interval to gain access to a channel of the unlicensed spectrum. The gating interval may define the application of a contention-based protocol, such as a Listen Before Talk (LBT) protocol based on the LBT protocol specified in ETSI (EN 301 893). When using a gating interval that defines the application of an LBT protocol, the gating interval may indicate when a transmitting device needs to perform a Clear Channel Assessment (CCA). The outcome of the CCA indicates to the transmitting device whether a channel of the unlicensed spectrum is available or in use. When the CCA indicates that the channel is available (e.g., "clear" for use), the gating interval may allow the transmitting device to use the channel—typically for a predefined transmission period. When the CCA indicates that the channel is not available (e.g., in use or reserved), the gating interval may prevent the transmitting device from using the channel during the transmission period.

In some cases, it may be useful for a transmitting device to generate a gating interval on a periodic basis and synchronize at least one boundary of the gating interval with at least one boundary of a periodic frame structure. For example, it may be useful to generate a periodic gating interval for a cellular downlink in an unlicensed spectrum, and to synchronize at least one boundary of the periodic gating interval with at least one boundary of a periodic frame structure (e.g., LTE radio frame) associated with the cellular downlink. Examples of such synchronization are shown in FIG. 3.

Figure 3:
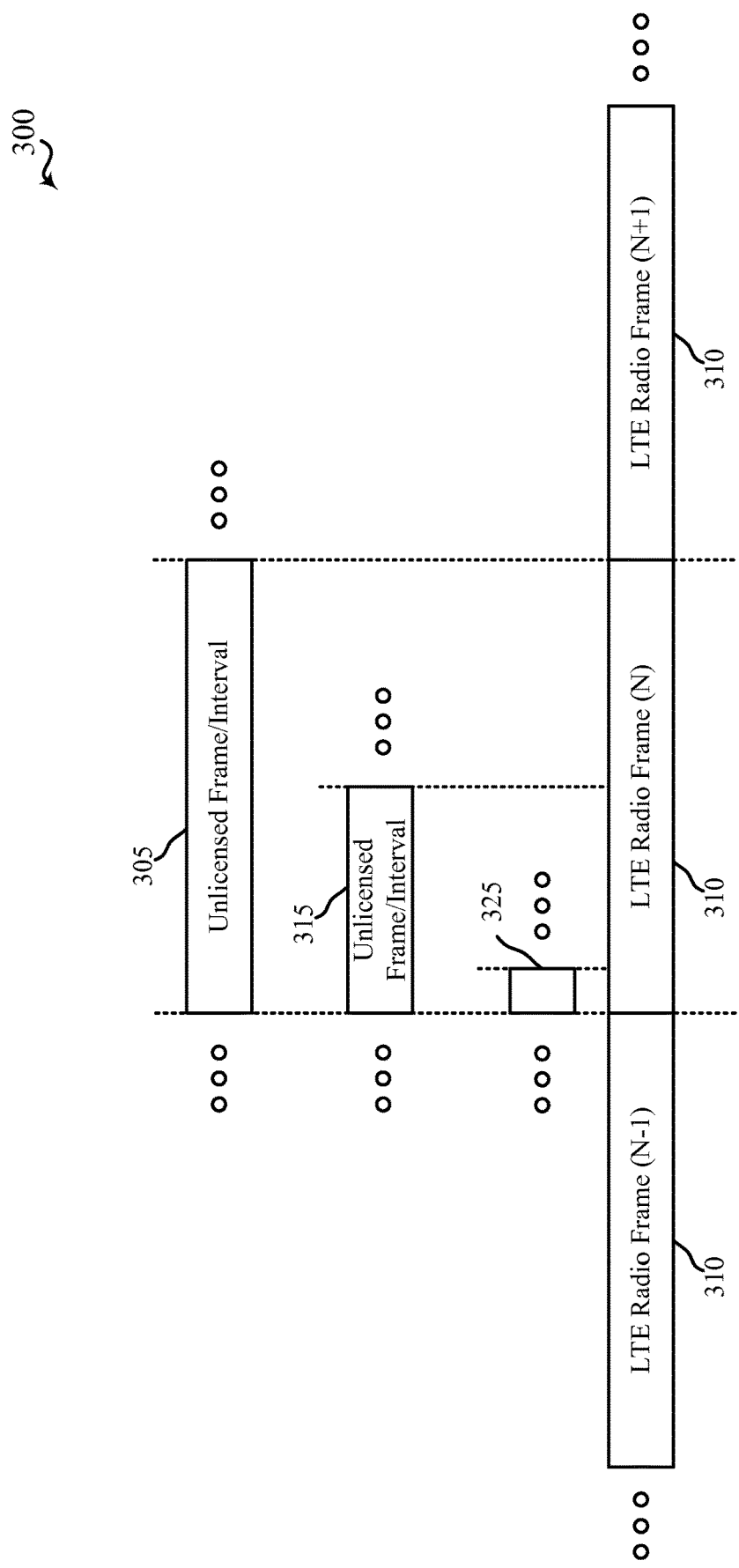
FIG. 3 shows various examples of unlicensed frames/intervals and their relationships to a period frame structure including, for example, LTE radio frames.

FIG. 3 illustrates examples 300 of an unlicensed frame/interval 305, 315, and/or 325 for a cellular downlink in an unlicensed spectrum. The unlicensed frame/interval 305, 315, and/or 325 may be used as a periodic gating interval by an eNB that supports transmissions over an unlicensed spectrum. Examples of such an eNB may be the access points 105 and/or eNBs 205 described with reference to FIGS. 1, 2A, and/or 2B. The unlicensed frame/interval 305, 315, and/or 325 may be used with the system 100, 200, and/or 250 described with reference to FIGS. 1, 2A, and/or 2B.

By way of example, the duration of the unlicensed frame/interval 305 is shown to be equal to (or approximately equal to) an LTE radio frame 310 of a periodic frame structure associated with a cellular downlink. In some embodiments, "approximately equal" means the duration of the unlicensed frame/interval 305 is within a cyclic prefix (CP) duration of the duration of the periodic frame structure.

At least one boundary of the unlicensed frame/interval 305 may be synchronized with at least one boundary of the periodic frame structure that includes the LTE radio frames N−1 to N+1. In some cases, the unlicensed frame/interval 305 may have boundaries that are aligned with the frame boundaries of the periodic frame structure. In other cases, the unlicensed frame/interval 305 may have boundaries that are synchronized with, but offset from, the frame boundaries of the periodic frame structure. For example, the boundaries of the unlicensed frame/interval 305 may be aligned with subframe boundaries of the periodic frame structure, or with subframe midpoint boundaries (e.g., the midpoints of particular subframes) of the periodic frame structure.

In some cases, the periodic frame structure may include LTE radio frames N−1 to N+1. Each LTE radio frame 310 may have a duration of ten milliseconds, for example, and the unlicensed frame/interval 305 may also have a duration of ten milliseconds. In these cases, the boundaries of the unlicensed frame/interval 305 may be synchronized with the boundaries (e.g., frame boundaries, subframe boundaries, or subframe midpoint boundaries) of one of the LTE radio frames (e.g., the LTE radio frame (N)).

By way of example, the duration of the unlicensed frames/intervals 315 and 325 are shown to be sub-multiples of (or approximate sub-multiples of) the duration of the periodic frame structure associated with the cellular downlink. In some embodiments, an "approximate sub-multiple of" means the duration of the unlicensed frame/interval 315, 325 is within a cyclic prefix (CP) duration of the duration of a sub-multiple of (e.g., half or one-tenth) the periodic frame structure. For example, the unlicensed frame/interval 315 may have a duration of five milliseconds and the unlicensed frame/interval 325 may have a duration of 1 or 2 milliseconds.

Figure 4:
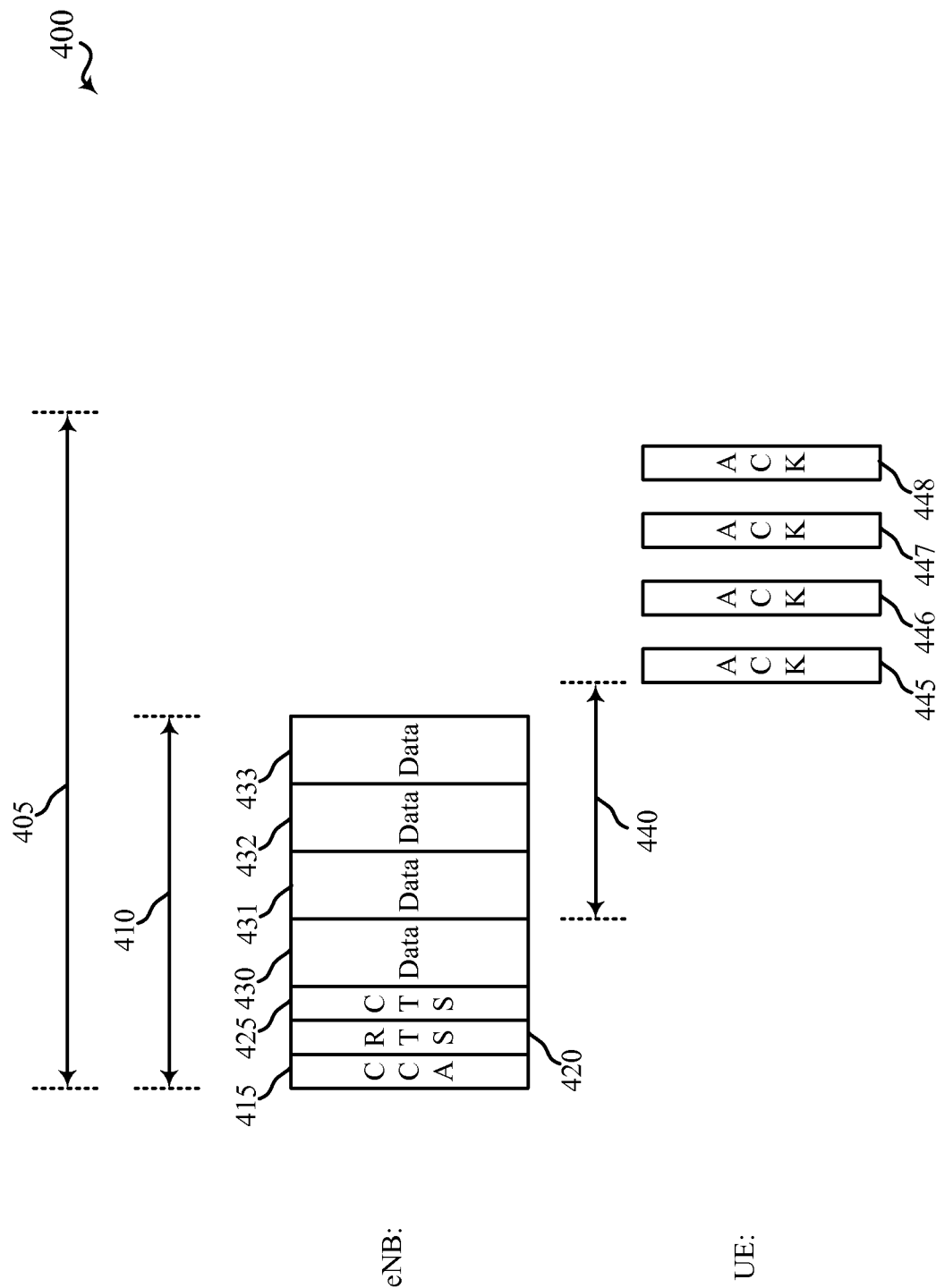
FIG. 4 illustrates an example use of an unlicensed frame/interval to transmit separate HARQ feedback messages.

FIG. 4 illustrates an example use 400 of an unlicensed frame/interval 405. In some embodiments, the unlicensed frame/interval 405 may be an example of a frame used by one or more of the eNBs 105 and/or 205 described with reference to FIGS. 1, 2A, and/or 2B. The unlicensed frame/interval 405 may define a channel occupancy period 410 including a CCA slot period 415, a Request To Send (RTS) signal period 420, a Clear To Send (CTS) signal period 425, and/or a number of data subframes 430, 431, 432, 433. In some cases, the unlicensed frame/interval 405 may have a duration of five or ten milliseconds.

The CCA slot period 415 may include one or more CCA slots. In some cases, one of the CCA slots may be pseudo-randomly selected by an eNB for performing CCA to determine availability of an unlicensed spectrum. The CCA slots may be pseudo-randomly selected such that some or all of the eNBs of a same operator deployment perform CCA in a common one of the CCA slots, and the eNBs of different operator deployments perform CCA in different ones of the CCA slots. In successive instances of the unlicensed frame/interval 405, the pseudo-random selection of CCA slots may result in different operator deployments selecting the first of the CCA slots. In this manner, each of a number of operator deployments may be given the first chance to perform CCA (e.g., a first operator deployment may select the first CCA slot in one unlicensed frame/interval, a second operator deployment may select the first CCA slot in a subsequent frame/interval, etc.). In some instances, the CCA slots may each have a duration of approximately 20 microseconds.

When an eNB performs CCA to determine availability of an unlicensed spectrum and determines that the unlicensed spectrum is available, the eNB may reserve a transmission period for transmitting one or more data subframes 430, 431, 432, 433. In some cases, multiple coordinated eNBs (e.g., two or more coordinated eNBs) may reserve the transmission period and transmit data. The simultaneous use of the transmission period by more than one eNB may be possible as a result of orthogonal transmissions, multiplexed transmissions, and/or the use of other time and/or frequency sharing mechanisms employed by a set of coordinated eNBs.

Optionally, the RTS signal period 420 may be used to send an RTS signal to a UE, thereby causing the UE to perform its own CCA. In these cases, the CTS signal period 425 may be used to receive a CTS signal indicating whether the UE's CCA was successful, and when the UE's CCA was successful, to reserve at least part of an uplink portion of the data frame 405 for receipt of HARQ feedback from the UE.

Upon transmitting each of one or more data subframes 430, 431, 432, 433 to a UE, the UE may respond to the eNB with HARQ feedback messages 445, 446, 447, 448. By way of example, the HARQ feedback messages 445, 446, 447, 448 may indicate to the eNB whether the one or more data subframes 430, 431, 432, 433 were successfully received and decoded by the UE (e.g., via an acknowledgement (ACK) or non-acknowledgement (NACK)). In some cases, the HARQ feedback may be transmitted as a separate HARQ feedback message 445, 446, 447, 448 for each of the one or more data subframes 430, 431, 432, 433. Each HARQ feedback message (e.g., HARQ feedback message 445) may be transmitted after a decoding delay 440 following the receipt of a corresponding data subframe (e.g., data subframe 430) by the UE.

Figure 5:
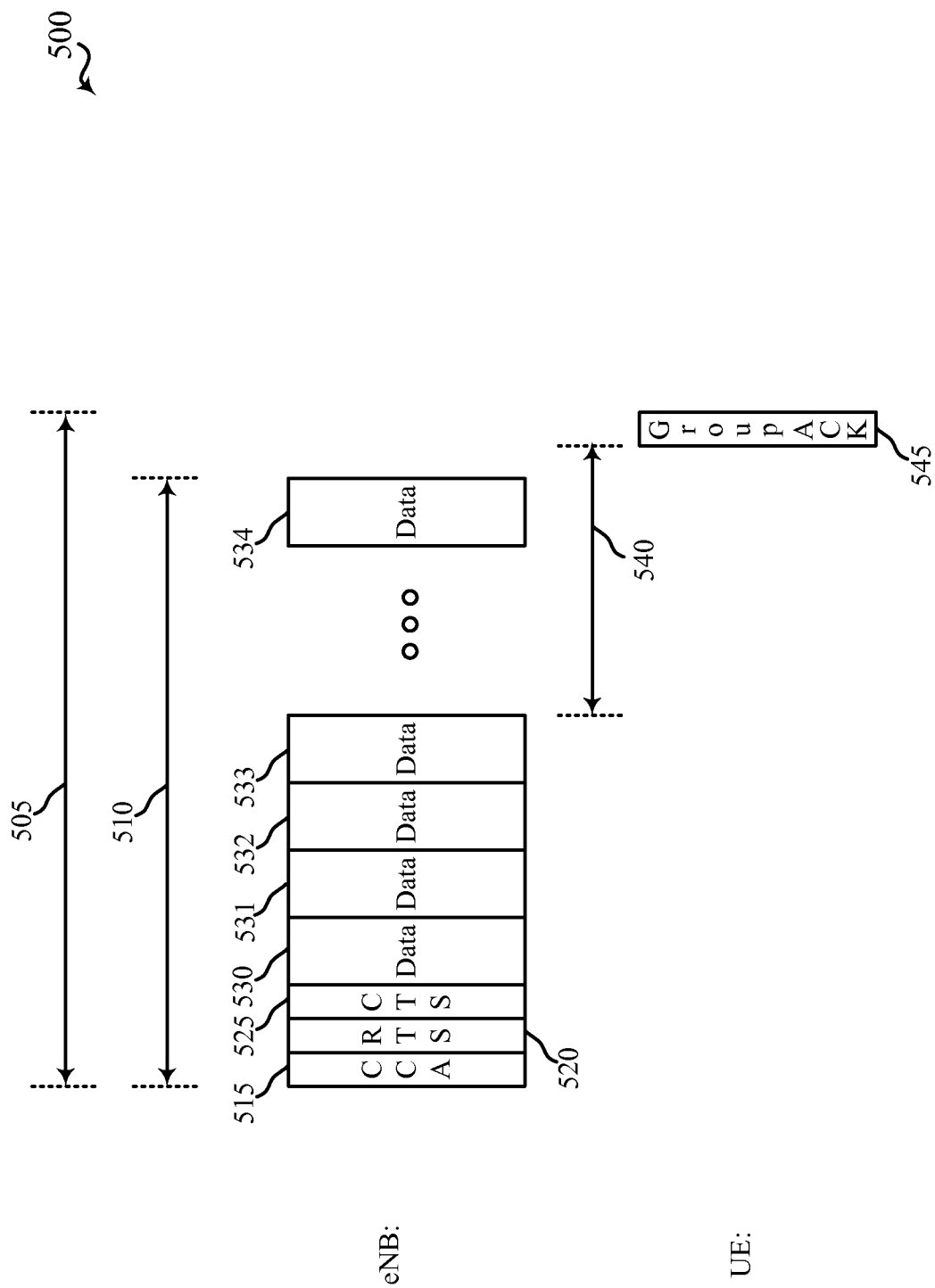
FIG. 5 illustrates an example use of an unlicensed frame/interval to transmit a synchronous group HARQ feedback message.

FIG. 5 illustrates another example use 500 of an unlicensed data frame 505 or interval. In some embodiments, the unlicensed data frame 505 or interval may be an example of a frame used by one or more of the eNBs 105 and/or 205 described with reference to FIGS. 1, 2A, and/or 2B. The unlicensed data frame 505 or interval may define a channel occupancy period 510 including a CCA slot period 515, an RTS signal period 520, a CTS signal period 525, and/or a number of data subframes 530, 531, 532, 533, 534. In some cases, the unlicensed data frame 505 or interval may have a duration of five or ten milliseconds.

The CCA slot period 515 may include one or more CCA slots. In some cases, one of the CCA slots may be pseudo-randomly selected by an eNB for performing CCA to determine availability of an unlicensed spectrum. The CCA slots may be pseudo-randomly selected such that some or all of the eNBs of a same operator deployment perform CCA in a common one of the CCA slots, and the eNBs of different operator deployments perform CCA in different ones of the CCA slots. In successive instances of the unlicensed frame/interval 405, the pseudo-random selection of CCA slots may result in different operator deployments selecting the first of the CCA slots. In this manner, each of a number of operator deployments may be given the first chance to perform CCA (e.g., a first operator deployment may select the first CCA slot in one unlicensed frame/interval, a second operator deployment may select the first CCA slot in a subsequent frame/interval, etc.). In some instances, the CCA slots may each have a duration of approximately 20 microseconds.

When an eNB performs CCA to determine availability of an unlicensed spectrum and determines that the unlicensed spectrum is available, the eNB may reserve a transmission period for transmitting one or more data subframes 530, 531, 532, 533, 534. In some cases, multiple coordinated eNBs (e.g., two or more coordinated eNBs) may reserve the transmission period and transmit data. The simultaneous use of the transmission period by more than one eNB may be possible as a result of orthogonal transmissions, multiplexed transmissions, and/or the use of other time and/or frequency sharing mechanisms employed by a set of coordinated eNBs.

Optionally, the RTS signal period 520 may be used to send an RTS signal to a UE, thereby causing the UE to perform its own CCA. In these cases, the CTS signal period 525 may be used to receive a CTS signal indicating whether the UE's CCA was successful, and when the UE's CCA was successful, to reserve at least part of an uplink portion of the data frame 505 for receipt of HARQ feedback from the UE.

For example, the eNB may transmit a request to send (RTS) signal to reserve channel access over the unlicensed spectrum, and receive, in response to the RTS signal, a CTS signal identifying when the unlicensed spectrum is available for transmission. Additionally or alternatively, the eNB may transmit a CTS signal to itself to denote when the unlicensed spectrum is available for transmission.

Upon transmitting each of one or more data subframes 530, 531, 532, 533 to a UE, the UE may respond to the eNB with a group HARQ feedback message 545. By way of example, the group HARQ feedback message 545 may indicate to the eNB whether the one or more data subframes 530, 531, 532, 533 were successfully received and decoded by the UE (e.g., via acknowledgements (ACKs) or non-acknowledgements (NACKs) for the group of data subframes 530, 531, 532, 533). The group HARQ feedback message 545 may in some cases include a single bit per codeword per HARQ identifier. The group HARQ feedback message 545 may include a bitmap that indicates, based on a position in the bitmap, a HARQ process identifier.

The group HARQ feedback message 545 may be transmitted after a decoding delay 540 following receipt, by the UE, of a last data subframe (e.g., data subframe 533) corresponding to the group HARQ feedback message.

Figure 6:
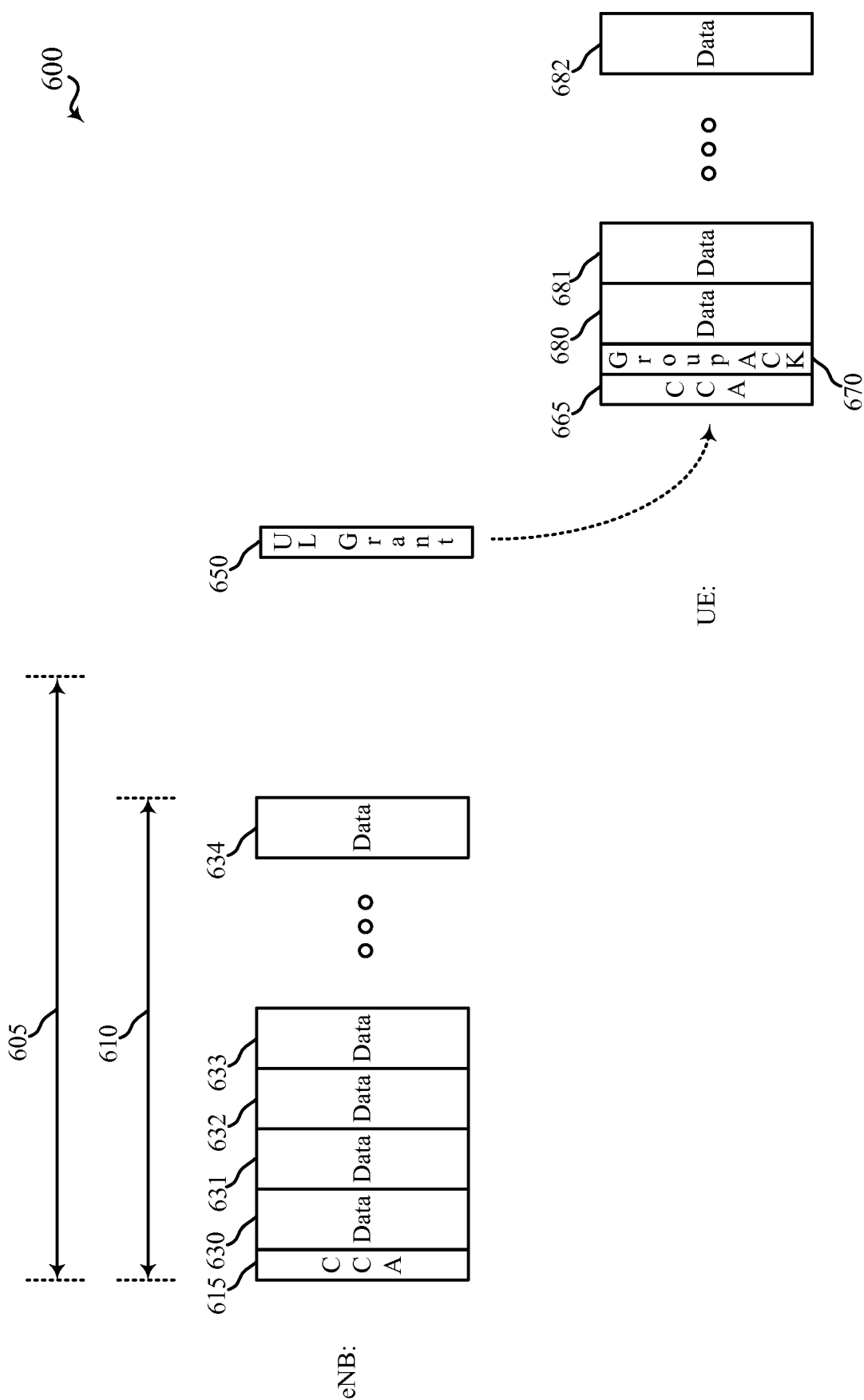
FIG. 6 illustrates an example use of an unlicensed frame/interval to transmit an asynchronous group HARQ feedback message.

FIG. 6 illustrates another example use 600 of an unlicensed data frame 605 or interval. In some embodiments, the unlicensed data frame 605 or interval may be an example of a frame used by one or more of the eNBs 105 and/or 205 described with reference to FIGS. 1, 2A, and/or 2B. The unlicensed data frame 605 or interval may define a channel occupancy period 610 including a CCA slot period 615 and/or a number of data subframes 630, 631, 632, 633, 634. In some cases, the unlicensed data frame 605 or interval may have a duration of five or ten milliseconds.

The CCA slot period 615 may include one or more CCA slots. In some cases, one of the CCA slots may be pseudo-randomly selected by an eNB for performing CCA to determine availability of an unlicensed spectrum. The CCA slots may be pseudo-randomly selected such that some or all of the eNBs of a same operator deployment perform CCA in a common one of the CCA slots, and the eNBs of different operator deployments perform CCA in different ones of the CCA slots. In successive instances of the unlicensed frame/interval 405, the pseudo-random selection of CCA slots may result in different operator deployments selecting the first of the CCA slots. In this manner, each of a number of operator deployments may be given the first chance to perform CCA (e.g., a first operator deployment may select the first CCA slot in one unlicensed frame/interval, a second operator deployment may select the first CCA slot in a subsequent frame/interval, etc.). In some instances, the CCA slots may each have a duration of approximately 20 microseconds.

When an eNB performs CCA to determine availability of an unlicensed spectrum and determines that the unlicensed spectrum is available, the eNB may reserve a transmission period for transmitting one or more data subframes 630, 631, 632, 633, 634. In some cases, multiple coordinated eNBs (e.g., two or more coordinated eNBs) may reserve the transmission period and transmit data. The simultaneous use of the transmission period by more than one eNB may be possible as a result of orthogonal transmissions, multiplexed transmissions, and/or the use of other time and/or frequency sharing mechanisms employed by a set of coordinated eNBs.

Upon transmitting each of one or more data subframes 630, 631, 632, 633, 634 to a UE, the UE may respond to the eNB with group HARQ feedback message 670. By way of example, the group HARQ feedback message 670 may indicate to the eNB whether the one or more data subframes 630, 631, 632, 633, 634 were successfully received and decoded by the UE (e.g., via acknowledgements (ACKs) or non-acknowledgements (NACKs) for the group of data subframes 630, 631, 632, 633, 634). The HARQ feedback messages 445, 446, 447, 448 may in some cases consist of a bit per codeword per HARQ identifier.

In contrast to what is described with reference to FIG. 5, the group HARQ feedback message 670 may be transmitted during a next data frame, in response to receiving an uplink grant 650 in the next data frame or sometime after the data frame during which the one or more data subframes 630, 631, 632, 633, 634 were transmitted. The uplink grant 650 may cause the UE to perform its own CCA in a CCA period 665, transmit the group HARQ feedback message 670, and then transmit at least one data subframe 680, 681, 682. The uplink grant 650 may in some cases include a Physical Downlink Shared Channel (PDSCH) or Physical Uplink Shared Channel (PUSCH) grant and be associated with a HARQ identifier and new data indicator. The group HARQ feedback message 670 may in some cases be transmitted together with other uplink data.

The example use 600 of the unlicensed data frame 605 or interval may eliminate a need for a separate Physical HARQ Indicator Channel (PHICH).

Figure 7A:
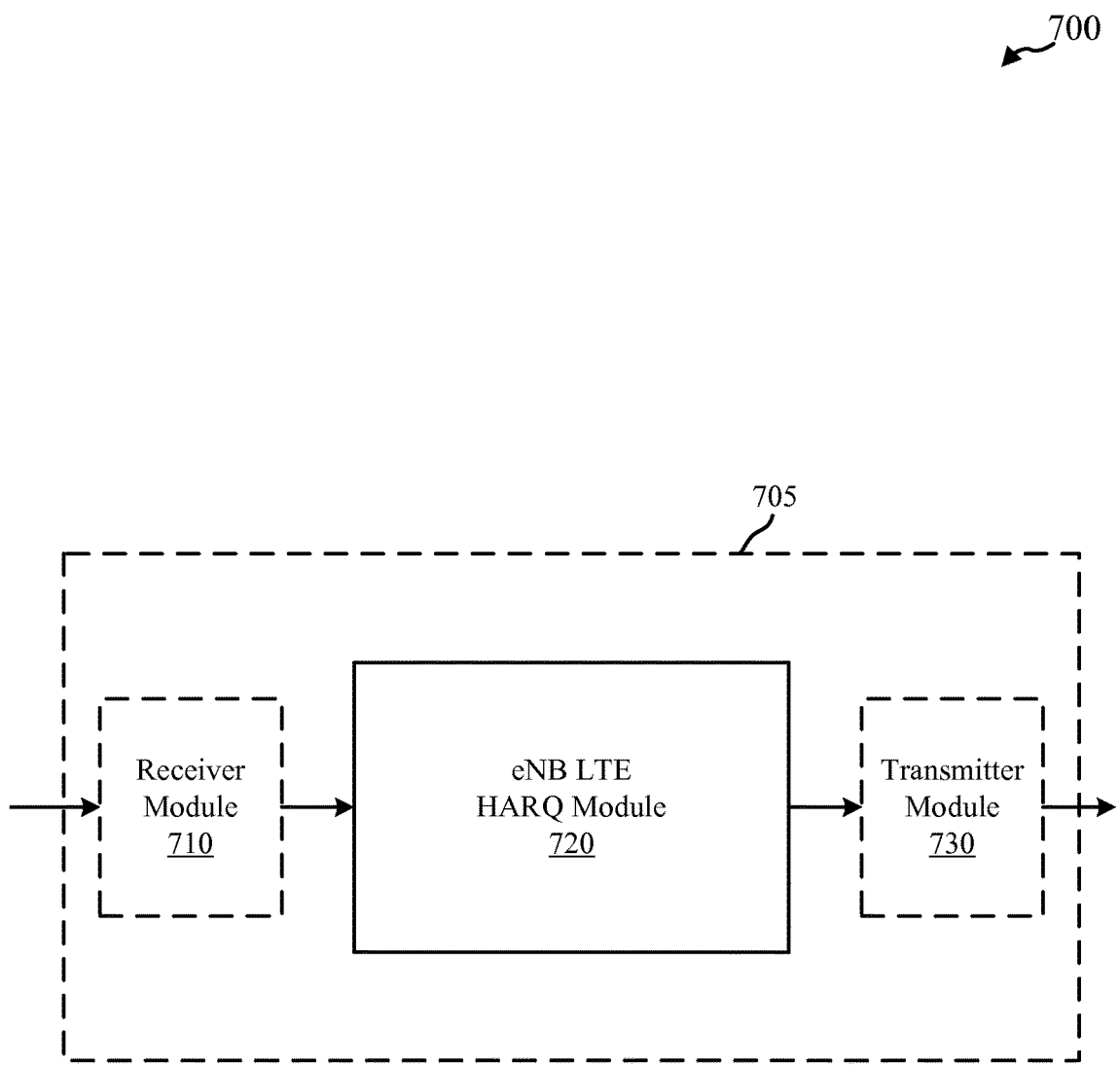
FIGS. 7A and 7B show block diagrams of examples of devices, such as eNBs, for use in wireless communications according to various embodiments.

Referring now to FIG. 7A, a block diagram 700 illustrates a device 705 for use in wireless communications in accordance with various embodiments. In some embodiments, the device 705 may be an example of one or more aspects of the eNBs 105 and/or 205 described with reference to FIGS. 1, 2A, and/or 2B. The device 705 may also be a processor. The device 705 may include a receiver module 710, an eNB LTE HARQ module 720, and/or a transmitter module 730. Each of these components may be in communication with each other.

The components of the device 705 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 710 may be or include a radio frequency (RF) receiver, such as an RF receiver operable to receive transmissions in a licensed spectrum and/or an unlicensed spectrum. The receiver module 710 may be used to receive various types of data and/or control signals (i.e., transmissions) over one or more communication links of a wireless communications system including the licensed and unlicensed spectrums, such as one or more communication links of the wireless communications system 100, 200, and/or 250 described with reference to FIGS. 1, 2A, and/or 2B.

In some embodiments, the transmitter module 730 may be or include an RF transmitter, such as an RF transmitter operable to transmit in the licensed spectrum and/or the unlicensed spectrum. The transmitter module 730 may be used to transmit various types of data and/or control signals (i.e., transmissions) over one or more communication links of a wireless communications system, such as one or more communication links of the wireless communications system 100, 200, and/or 250 described with reference to FIGS. 1, 2A, and/or 2B.

In some embodiments or modes of operation (e.g., in a synchronous mode of operation between the device 705 and a UE), the eNB LTE HARQ module 720 may transmit a set of one or more data subframes of a data frame over an unlicensed spectrum to a UE. The set of one or more data subframes may be transmitted during a transmission period (e.g., a transmission period of the data frame). An example transmission of a set of one or more data subframes 530, 531, 532, 533, 534 of a data frame 505 is described with reference to FIG. 5. The eNB LTE HARQ module 720 may also receive a group HARQ feedback message for a plurality of data subframes. In one example, the group HARQ feedback messages may be received either periodically or in response to a trigger. In one example, the trigger may be issued by the eNB LTE HARQ module 720 to elicit a group HARQ feedback message from the UE. In another example, the eNB LTE HARQ module 720 may receive group HARQ feedback messages from the UE periodically on a predetermined time interval. The group HARQ feedback message may be received over the unlicensed spectrum, from the UE, during the transmission period. The plurality of data subframes for which the group HARQ feedback message is received may include at least one of the data subframes in the transmitted set of one or more data subframes (e.g., one of the data subframes in the set of one or more data subframes; two or more of the data subframes in the set of one or more data subframes; or all of the data subframes in the set of one or more data subframes). Optionally, the plurality of data subframes for which the group HARQ feedback message is received may also or alternately include one or more data subframes transmitted during a previous data frame (i.e., the HARQ feedback message may include HARQ feedback information for one or more of the data subframes transmitted during the previous data frame). An example reception of a group HARQ feedback message 545 for a plurality of data subframes 530, 531, 532, 533 is described with reference to FIG. 5.

In some embodiments or modes of operation (e.g., in an asynchronous mode of operation between the device 705 and a UE), the eNB LTE HARQ module 720 may transmit a set of one or more data subframes of a data frame over an unlicensed spectrum to a UE. The set of one or more data subframes may be transmitted during a transmission period (e.g., a transmission period of the data frame). An example transmission of a set of one or more data subframes 630, 631, 632, 633, 634 of a data frame 605 is described with reference to FIG. 6. The eNB LTE HARQ module 720 may also transmit an uplink grant over the unlicensed spectrum to the UE. The uplink grant may be transmitted after the transmission period (e.g., during a next transmission period of a next data frame). An example transmission of an uplink grant 650 is described with reference to FIG. 6. The eNB LTE HARQ module 720 may then receive a group HARQ feedback message for a plurality of data subframes. The group HARQ feedback message may be received over the unlicensed spectrum in response to the uplink grant. The plurality of data subframes for which the group HARQ feedback message is received may include at least one of the data subframes in the transmitted set of one or more data subframes (e.g., one of the data subframes in the set of one or more data subframes; two or more of the data subframes in the set of one or more data subframes; or all of the data subframes in the set of one or more data subframes). Optionally, the plurality of data subframes for which the group HARQ feedback message is received may also or alternately include one or more data subframes transmitted during a previous data frame (i.e., the HARQ feedback message may include HARQ feedback information for one or more of the data subframes transmitted during the previous data frame). An example reception of a group HARQ feedback message 670 for a plurality of data subframes 630, 631, 632, 633, 634 is described with reference to FIG. 6.

Figure 7B:
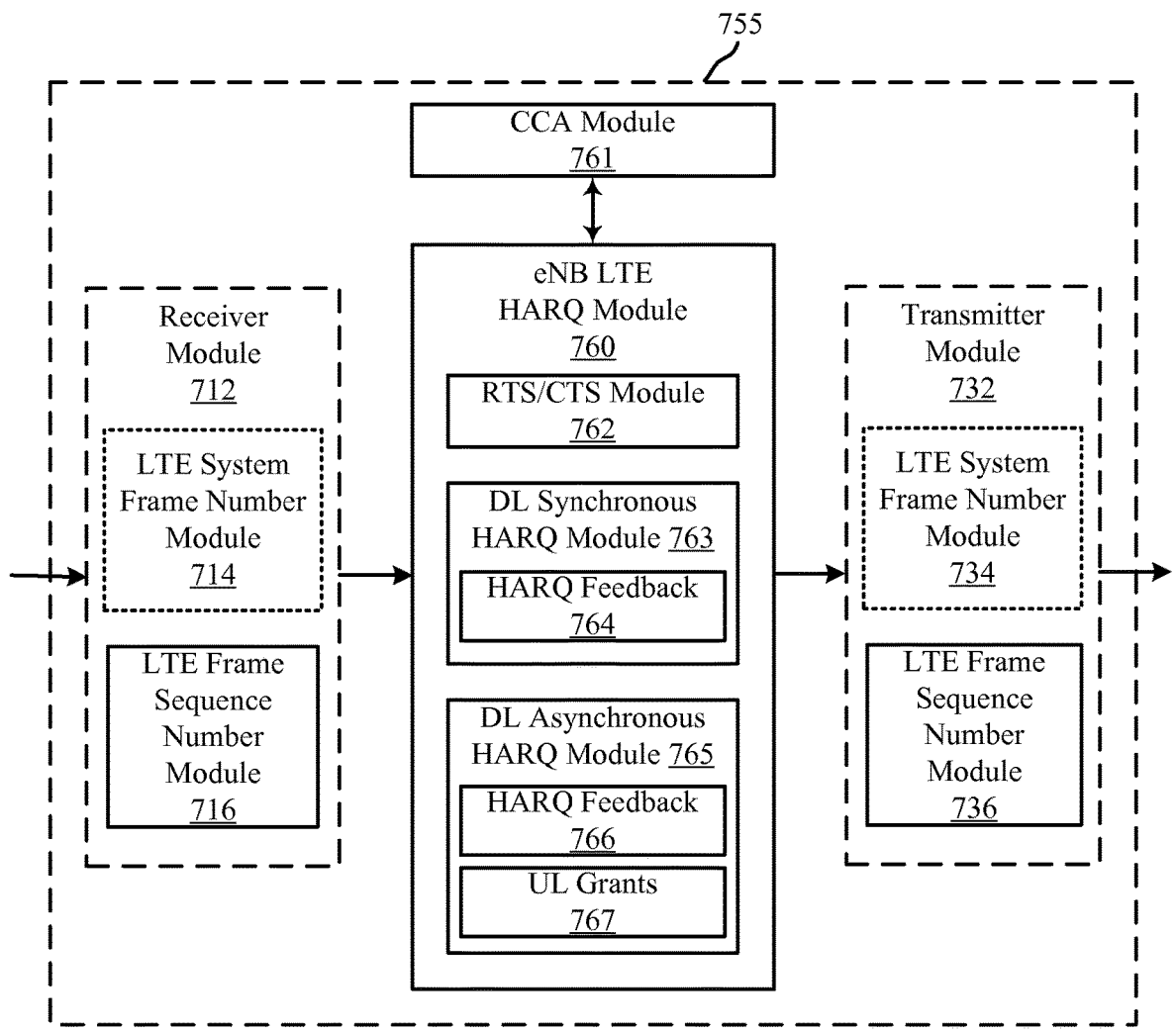

Referring now to FIG. 7B, a block diagram 750 illustrates a device 755 for use in wireless communications in accordance with various embodiments. In some embodiments, the device 755 may be an example of one or more aspects of the eNBs 105, 205, and/or 705 described with reference to FIGS. 1, 2A, 2B, and/or 7. The device 755 may also be a processor. The device 755 may include a receiver module 712, an eNB LTE HARQ module 760, a CCA module 761, and/or a transmitter module 732. Each of these components may be in communication with each other.

The components of the device 755 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 712 may include an RF receiver, such as an RF receiver operable to receive transmissions in a licensed spectrum (e.g., an LTE spectrum) and/or an unlicensed spectrum. The RF receiver may include separate receivers for the licensed spectrum and the unlicensed spectrum. The separate receivers may in some cases take the form of an LTE system frame number (SFN) module 714 and an LTE frame sequence number module 716. The LTE SFN module 714 may be used to receive LTE frames according to the use of SFNs and the LTE frame sequence number module 716 may be used to receive frames from LTE/LTE-A in an unlicensed or shared spectrum according to the use of sequence numbers. The sequence numbers may be used to identify a sequence or some order of frames in the LTE/LTE-A in an unlicensed spectrum to resolve ambiguities at a UE when a CCA procedure at an eNB does not capture the channel at each attempt. That is, the sequence number may identify, in addition to the SFN, a successful transmission over an unlicensed spectrum by an eNB. The LTE SFN module 714 may be optional (as shown by the dotted lines) when the device 755 is used for LTE/LTE-A in an unlicensed or shared spectrum operations. The receiver module 712, including modules 714 and/or 716, may be used to receive various types of data and/or control signals (i.e., transmissions) over one or more communication links of a wireless communications system including the licensed and unlicensed spectrums, such as one or more communication links of the wireless communications system 100, 200, and/or 250 described with reference to FIGS. 1, 2A, and/or 2B. The LTE SFN module 714 may be optional (as shown by the dotted lines) when the device 755 operates typically over an unlicensed spectrum.

In some embodiments, the transmitter module 732 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of an LTE SFN module 734 and an LTE frame sequence number module 736. The LTE SFN module 734 may be used to receive LTE frames according to the use of SFN and the LTE frame sequence number module 736 may be used to receive frames from LTE/LTE-A in an unlicensed or shared spectrum according to the use of sequence numbers. The LTE SFN module 734 may be optional (as shown by the dotted lines) when the device 755 is used for LTE/LTE-A in an unlicensed or shared spectrum operations. The transmitter module 732, including modules 734 and/or 736, may be used to transmit various types of data and/or control signals (i.e., transmissions) over one or more communication links of a wireless communications system, such as one or more communication links of the wireless communications system 100, 200, and/or 250 described with reference to FIGS. 1, 2A, and/or 2B. The LTE SFN module 734 may be optional (as shown by the dotted lines) when the device 755 operates typically over an unlicensed spectrum.

In some embodiments, the CCA module 761 may perform CCA to determine availability of an unlicensed spectrum. When a determination is made that the unlicensed spectrum is available, the unlicensed spectrum may be accessed during a data frame to which the CCA applies. The CCA module 761 may perform a respective CCA for each data frame during which it desires to access the unlicensed spectrum.

The eNB LTE HARQ module 760 may be an example of the eNB LTE HARQ module 720 described with reference to FIG. 7A and may include an RTS/CTS module 762, a DL synchronous HARQ module 763, and/or a DL asynchronous HARQ module 765. Each of these components may be in communication with each other.

The RTS/CTS module 762 may be used to request and reserve channel access over an unlicensed spectrum (e.g., instead of or along with using the CCA module 761). For example, when operating in a synchronous mode of operation between the device 755 and a UE, the RTS/CTS module 762 may transmit an RTS message over the unlicensed spectrum to the UE. The RTS message may be transmitted via the LTE frame sequence number module 736 of the transmitter module 732. The RTS message may be transmitted after performing CCA, and may signal to the UE that the UE also needs to perform CCA. Upon successfully performing CCA, the UE may reserve the unlicensed spectrum for transmission of the group HARQ feedback message. Additionally or alternatively, the RTS/CTS module 762 may be used independent of the CCA module 861. In some examples, the UE may also transmit a CTS message over the unlicensed spectrum. The CTS message may be received from the UE by the RTS/CTS module 762 and may cause the DL synchronous HARQ module 763 to reserve an uplink portion of the transmission period to receive the group HARQ feedback message from the UE. The CTS message may be received via the LTE frame sequence number module 716 of the receiver module 712. Additionally or alternatively, the RTS/CTS module 762 may transmit a self-addressed CTS message to itself to denote when the unlicensed spectrum is available for transmission.

The DL synchronous HARQ module 763 may be used in a synchronous mode of operation between the device 755 and a UE. In such a mode, the DL synchronous HARQ module 763 may transmit a set of one or more data subframes of a data frame over an unlicensed spectrum to a UE. The set of one or more data subframes may be transmitted during a transmission period (e.g., a transmission period of the data frame), and may be transmitted via the LTE frame sequence number module 736 of the transmitter module 732. In some embodiments, the set of one or more data subframes of a data frame may be transmitted during a downlink portion of the transmission period. An example transmission of a set of one or more data subframes 530, 531, 532, 533, 534 of a data frame 505 is described with reference to FIG. 5.

When operating in the synchronous mode of operation between the device 755 and a UE, the HARQ feedback module 764 may receive a group HARQ feedback message for a plurality of data subframes. The group HARQ feedback message may be received over the unlicensed spectrum, from the UE, during the transmission period, and may be received via the LTE frame sequence number module 716 of the receiver module 712. In some cases, the group HARQ feedback message may be received after the downlink portion of the transmission period. The plurality of data subframes for which the group HARQ feedback message is received may include at least one of the data subframes in the transmitted set of one or more data subframes (e.g., one of the data subframes in the set of one or more data subframes; two or more of the data subframes in the set of one or more data subframes; or all of the data subframes in the set of one or more data subframes). Optionally, the plurality of data subframes for which the group HARQ feedback message is received may also or alternately include one or more data subframes transmitted during a previous data frame (i.e., the HARQ feedback message may include HARQ feedback information for one or more of the data subframes transmitted during the previous data frame). An example reception of a group HARQ feedback message 545 for a plurality of data subframes 530, 531, 532, 533 is described with reference to FIG. 5.

In some cases, the plurality of data subframes for which the group HARQ feedback message is received may include a subset of the transmitted set of one or more data subframes (i.e., the group HARQ feedback message may include HARQ feedback information for the subset of the set of one or more data subframes). In these cases, the HARQ feedback module 764 may also receive a next group HARQ feedback message for a remaining subset of the transmitted set of one or more data subframes. The next group HARQ feedback message may be received over the unlicensed spectrum, from the UE, during a next transmission period. The next transmission period may in some cases be during a next data frame. The remaining subset of data subframes for which the next group HARQ feedback message is received may include a remaining subset of the transmitted set of one or more data subframes (e.g., those data subframes for which HARQ feedback information was not included in the HARQ feedback message received during the current transmission period or data frame). Optionally, the next group HARQ feedback message may also include HARQ feedback information for one or more data subframes transmitted during the next transmission period (e.g., during the next data frame).

In some cases, the group HARQ feedback message received by the HARQ feedback module 764 (and if received, the next group HARQ feedback message) may include an acknowledgment for each of a number of data subframes decoded by a UE. The group HARQ feedback message received by the HARQ feedback module 764 (and if transmitted, the next group HARQ feedback message)

may also include a non-acknowledgement for each of a number of data subframes that were not decoded (or not correctly decoded) by a UE.

In some cases, the group HARQ feedback message received by the HARQ feedback module 764 (and if transmitted, the next group HARQ feedback message) may include a process identifier for each of a plurality of data subframes being acknowledged by the UE.

In some embodiments, one or both of CSI feedback and an SRS may be received by the HARQ feedback module 764, over the unlicensed spectrum from the UE, concurrently with a group HARQ feedback message and/or a next group HARQ feedback message.

The DL asynchronous HARQ module 765 may be used in an asynchronous mode of operation between the device 755 and a UE. In such a mode, the DL asynchronous HARQ module 765 may transmit a set of one or more data subframes of a data frame over an unlicensed spectrum to a UE. The set of one or more data subframes may be transmitted during a transmission period (e.g., a transmission period of the data frame), and may be transmitted via the LTE frame sequence number module 736 of the transmitter module 732. In some embodiments, the set of one or more data subframes of a data frame may be transmitted during a downlink portion of the transmission period. An example transmission of a set of one or more data subframes 630, 631, 632, 633, 634 of a data frame 605 is described with reference to FIG. 6.

When operating in the asynchronous mode of operation between the device 755 and a UE, the UL grants module 767 may transmit an uplink grant over the unlicensed spectrum to the UE. The uplink grant may be transmitted after the transmission period (e.g., during a next transmission period of a next data frame), and may be transmitted via the LTE frame sequence number module 736 of the transmitter module 732. An example transmission of an uplink grant 650 is described with reference to FIG. 6.

Also when operating in the asynchronous mode of operation between the device 755 and a UE, the HARQ feedback module 766 may receive a group HARQ feedback message for a plurality of data subframes. The group HARQ feedback message may be received over the unlicensed spectrum in response to the uplink grant, and may be received via the LTE frame sequence number module 716 of the receiver module 712. The plurality of data subframes for which the group HARQ feedback message is received may include at least one of the data subframes in the transmitted set of one or more data subframes (e.g., one of the data subframes in the set of one or more data subframes; two or more of the data subframes in the set of one or more data subframes; or all of the data subframes in the set of one or more data subframes). Optionally, the plurality of data subframes for which the group HARQ feedback message is received may also or alternately include one or more data subframes transmitted during a previous data frame (i.e., the HARQ feedback message may include HARQ feedback information for one or more of the data subframes transmitted during the previous data frame). An example reception of a group HARQ feedback message 670 for a plurality of data subframes 630, 631, 632, 633, 634 is described with reference to FIG. 6.

The uplink grant and/or group HARQ feedback message may in some cases be transmitted by the UL grants module 767, or received by the HARQ feedback module 766, during a next data frame.

In some cases, the group HARQ feedback message received by the HARQ feedback module 766 may include an acknowledgment for each of a number of data subframes decoded by the UE. The group HARQ feedback message received by the HARQ feedback module 766 may also include a non-acknowledgement for each of a number of data subframes that were not decoded (or not correctly decoded) by the UE.

In some cases, the group HARQ feedback message received by the HARQ feedback module 766 may include a process identifier for each of a plurality of data subframes being acknowledged by the UE in the group HARQ feedback message.

In some embodiments, one or both of CSI feedback and an SRS may be received by the HARQ feedback module 766, over the unlicensed spectrum from the UE, concurrently with the group HARQ feedback message.

In some cases, the previous data frame, data frame, and/or next data frame in which the eNB LTE HARQ module 760 transmits and/or receives control signals or data may be temporally adjacent data frames (i.e., not separated by other data frames transmitted over the unlicensed spectrum). In other cases, one or more other data frames may be transmitted over the unlicensed spectrum between the previous data frame, data frame, and/or next data frame. The other data frames may in some cases be transmitted by one or more devices other than the device 755, and may occur because the device 755 fails to perform a successful CCA for the other data frames (and therefore cannot gain access to the unlicensed spectrum during the other data frames).

Figure 8A:
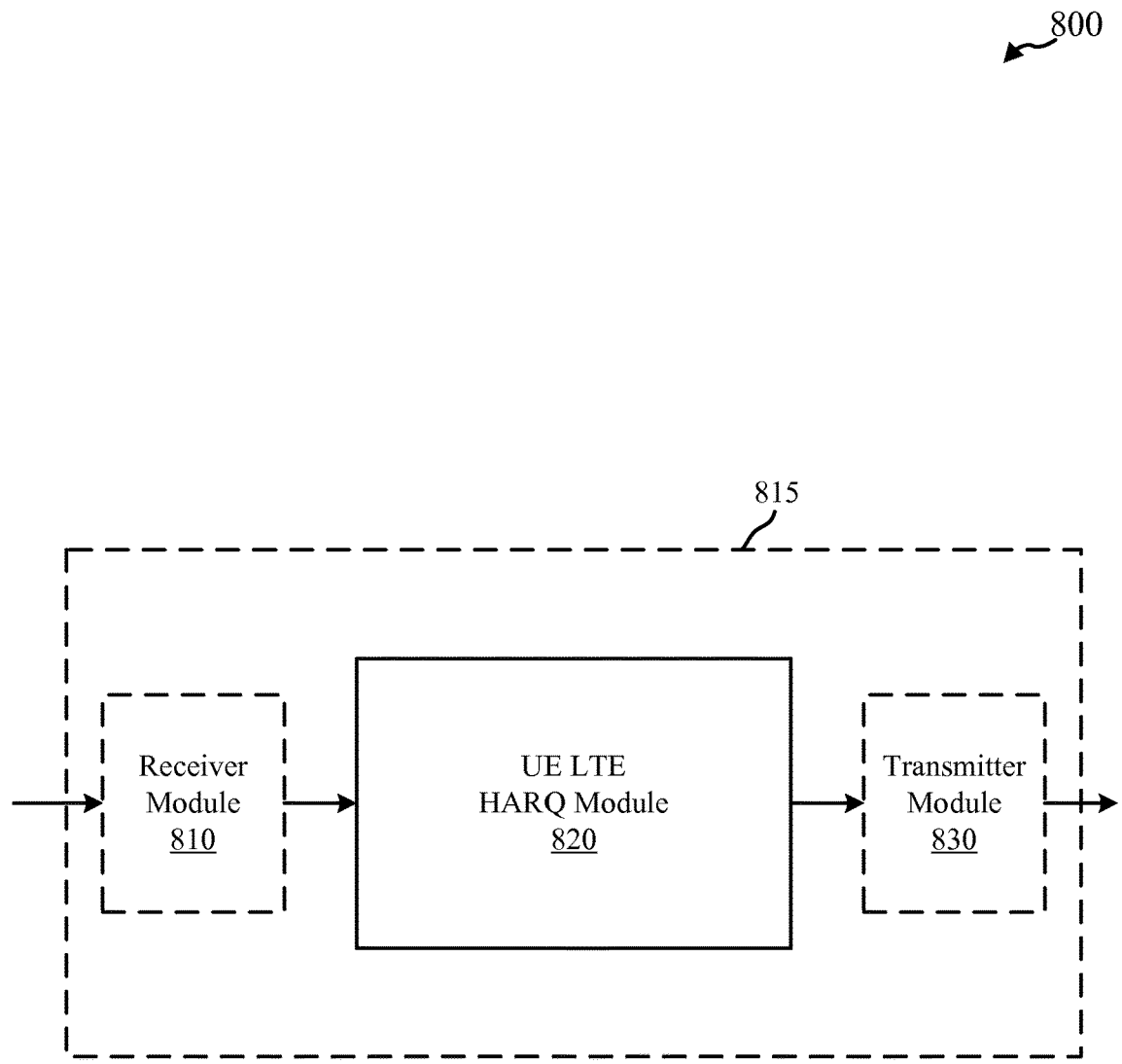
FIGS. 8A and 8B show block diagrams of examples of devices, such as UEs, for use in wireless communications according to various embodiments.

Referring now to FIG. 8A, a block diagram 800 illustrates a device 815 for use in wireless communications in accordance with various embodiments. In some embodiments, the device 815 may be an example of one or more aspects of the UEs 115 and/or 215 described with reference to FIGS. 1, 2A, and/or 2B. The device 815 may also be a processor. The device 815 may include a receiver module 810, a UE LTE HARQ module 820, and/or a transmitter module 830. Each of these components may be in communication with each other.

The components of the device 815 may, individually or collectively, be implemented with one or more application-specific integrated circuits ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 810 may be or include an RF receiver, such as an RF receiver operable to receive transmissions in a licensed spectrum (e.g., an LTE spectrum) and/or an unlicensed spectrum. The receiver module 810 may be used to receive various types of data and/or control signals (i.e., transmissions) over one or more communication links of a wireless communications system including the licensed and unlicensed spectrums, such as one or more communication links of the wireless communications system 100, 200, and/or 250 described with reference to FIGS. 1, 2A, and/or 2B.

In some embodiments, the transmitter module 830 may be or include an RF transmitter, such as an RF transmitter operable to transmit in the licensed spectrum and/or the unlicensed spectrum. The transmitter module 830 may be used to transmit various types of data and/or control signals (i.e., transmissions) over one or more communication links of a wireless communications system, such as one or more communication links of the wireless communications system 100, 200, and/or 250 described with reference to FIGS. 1, 2A, and/or 2B.

In some embodiments or modes of operation (e.g., in a synchronous mode of operation between the device 815 and an eNB), the UE LTE HARQ module 820 may receive a set of one or more data subframes of a data frame over an unlicensed spectrum. The set of one or more data subframes may be received during a transmission period (e.g., a transmission period of the data frame). An example reception of a set of one or more data subframes 530, 531, 532, 533, 534 of a data frame 505 is described with reference to FIG. 5. The UE LTE HARQ module 820 may also transmit a group HARQ feedback message for a plurality of data subframes. The group HARQ feedback message may be transmitted over the unlicensed spectrum during the transmission period. In some examples, the group HARQ feedback message is transmitted periodically or in response to a trigger. In one example, the UE LTE HARQ module 820 may transmit a group HARQ feedback message in response to a trigger received from the eNB. In other examples, the group HARQ feedback messages may be transmitted periodically on a predetermined time interval. The plurality of data subframes for which the group HARQ feedback message is transmitted may include at least one of the data subframes in the received set of one or more data subframes (e.g., one of the data subframes in the set of one or more data subframes; two or more of the data subframes in the set of one or more data subframes; or all of the data subframes in the set of one or more data subframes). Optionally, the plurality of data subframes for which the group HARQ feedback message is transmitted may also or alternately include one or more data subframes received during a previous data frame (i.e., the HARQ feedback message may include HARQ feedback information for one or more of the data subframes received during the previous data frame). An example transmission of a group HARQ feedback message 545 for a plurality of data subframes 530, 531, 532, 533 is described with reference to FIG. 5.

In some embodiments or modes of operation (e.g., in an asynchronous mode of operation between the device 815 and an eNB), the UE LTE HARQ module 820 may receive a set of one or more data subframes of a data frame over an unlicensed spectrum. The set of one or more data subframes may be received during a transmission period (e.g., a transmission period of the data frame). An example transmission of a set of one or more data subframes 630, 631, 632, 633, 634 of a data frame 605 is described with reference to FIG. 6. The UE LTE HARQ module 820 may also receive an uplink grant over the unlicensed spectrum. The uplink grant may be received after the transmission period (e.g., during a next transmission period of a next data frame). An example reception of an uplink grant 650 is described with reference to FIG. 6. The UE LTE HARQ module 820 may also transmit a group HARQ feedback message for a plurality of data subframes. The group HARQ feedback message may be transmitted over the unlicensed spectrum in response to the uplink grant. The plurality of data subframes for which the group HARQ feedback message is transmitted may include at least one of the data subframes in the received set of one or more data subframes (e.g., one of the data subframes in the set of one or more data subframes; two or more of the data subframes in the set of one or more data subframes; or all of the data subframes in the set of one or more data subframes). Optionally, the plurality of data subframes for which the group HARQ feedback message is transmitted may also or alternately include one or more data subframes transmitted during a previous data frame (i.e., the HARQ feedback message may include HARQ feedback information for one or more of the data subframes received during the previous data frame). An example transmission of a group HARQ feedback message 670 for a plurality of data subframes 630, 631, 632, 633, 634 is described with reference to FIG. 6.

Figure 8B:
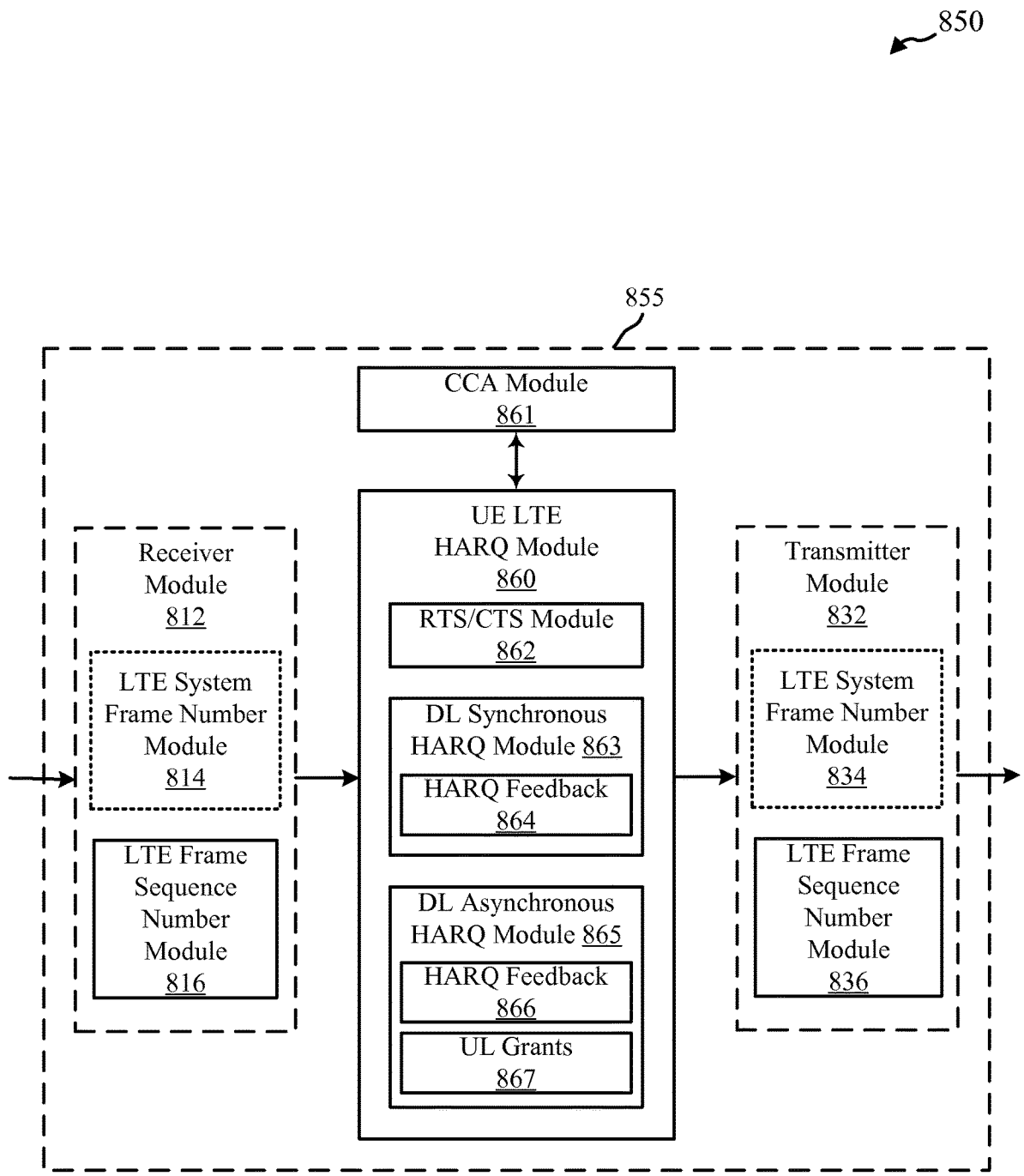

Referring now to FIG. 8B, a block diagram 850 illustrates a device 855 for use in wireless communications in accordance with various embodiments. In some embodiments, the device 855 may be an example of one or more aspects of the UEs 115, 215, and/or 815 described with reference to FIGS. 1, 2A, 2B, and/or 8A. The device 855 may also be a processor. The device 855 may include a receiver module 812, a UE LTE HARQ module 860, a CCA module 861, and/or a transmitter module 832. Each of these components may be in communication with each other.

The components of the device 855 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 812 may be or include an RF receiver, such as an RF receiver operable to receive transmissions in a licensed spectrum (e.g., an LTE spectrum) and/or an unlicensed spectrum. The RF receiver may include separate receivers for the licensed spectrum and the unlicensed spectrum. The separate receivers may in some cases take the form of an LTE SFN module 814 and an LTE frame sequence number module 816. The LTE SFN module 814 may be used to receive LTE frames according to the use of SFNs and the LTE frame sequence number module 816 may be used to receive frames from LTE/LTE-A in an unlicensed or shared spectrum according to the use of sequence numbers. The LTE SFN module 814 may be optional (as shown by the dotted lines) when the device 855 is used for LTE/LTE-A in an unlicensed or shared spectrum operations. The receiver module 812, including the modules 814 and/or 816, may be used to receive various types of data and/or control signals (i.e., transmissions) over one or more communication links of a wireless communications system including the licensed and unlicensed spectrums, such as one or more communication links of the wireless communications system 100, 200, and/or 250 described with reference to FIGS. 1, 2A, and/or 2B. The licensed spectrum module 814 may be optional (as shown by the dotted lines) when the device 855 operates typically over an unlicensed spectrum.

In some embodiments, the transmitter module 832 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of an LTE SFN module 834 and an LTE frame sequence number module 836. The LTE SFN module 834 may be used to receive LTE frames according to the use of SFNs and the LTE frame sequence number module 836 may be used to receive LTE frames according to the use of sequence numbers. The LTE SFN module 834 may be optional (as shown by the dotted lines) when the device 855 is used for LTE operations. The transmitter module 832, including modules 834 and/or 836, may be used to transmit various types of data and/or control signals (i.e., transmissions) over one or more communication links of a wireless communications system, such as one or more communication links of the wireless communications system 100, 200, and/or 250 described with reference to FIGS. 1, 2A, and/or 2B. The licensed spectrum module 834 may be optional (as shown by the dotted lines) when the device 855 operates typically over an unlicensed spectrum.

In some embodiments, the CCA module 861 may perform CCA to determine availability of an unlicensed spectrum. When a determination is made that the unlicensed spectrum is available, the unlicensed spectrum may be accessed during a data frame to which the CCA applies. The CCA module 861 may perform a respective CCA for each data frame during which it desires to access the unlicensed spectrum.

The UE LTE HARQ module 860 may be an example of the UE LTE HARQ module 820 described with reference to FIG. 8A and may include an RTS/CTS module 862, a DL synchronous HARQ module 863, and/or a DL asynchronous HARQ module 865. Each of these components may be in communication with each other.

In some embodiments, the RTS/CTS module 862 may be used by an eNB to trigger performance of a CCA by the CCA module 861. to request and reserve channel access over an unlicensed spectrum (e.g., instead of or along with using the CCA module 761). For example, the RTS/CTS module 862 may receive an RTS message over the unlicensed spectrum and, in response to the RTS message, cause the CCA module 861 to perform CCA. The RTS message may be received via the unlicensed spectrum module 816 of the receiver module 812. Upon the CCA module 861 successfully performing CCA, the CCA module 861 may provide an indication of the successful CCA to the RTS/CTS module 862. The RTS/CTS module 862 may then transmit a CTS message over the unlicensed spectrum (e.g., to the eNB that transmitted the RTS message). The CTS message may be transmitted via the unlicensed spectrum module 836 of the transmitter module 832.

The DL synchronous HARQ module 863 may be used in a synchronous mode of operation between the device 785 and a UE. In such a mode, the DL synchronous HARQ module 863 may receive a set of one or more data subframes of a data frame over an unlicensed spectrum. The set of one or more data subframes may be received during a transmission period (e.g., a transmission period of the data frame), and may be received via the unlicensed spectrum module 816 of the receiver module 812. In some embodiments, the set of one or more data subframes of a data frame may be received during a downlink portion of the transmission period. An example reception of a set of one or more data subframes 530, 531, 532, 533, 534 of a data frame 505 is described with reference to FIG. 5.

When operating in the synchronous mode of operation between the device 855 and an eNB, the HARQ feedback module 864 may transmit a group HARQ feedback message for a plurality of data subframes. The group HARQ feedback message may be transmitted over the unlicensed spectrum during the transmission period, and may be transmitted via the unlicensed spectrum module 836 of the transmitter module 832. In some cases, the group HARQ feedback message may be transmitted after the downlink portion of the transmission period. The plurality of data subframes for which the group HARQ feedback message is transmitted may include at least one of the data subframes in the received set of one or more data subframes (e.g., one of the data subframes in the set of one or more data subframes; two or more of the data subframes in the set of one or more data subframes; or all of the data subframes in the set of one or more data subframes). Optionally, the plurality of data subframes for which the group HARQ feedback message is transmitted may also or alternately include one or more data subframes received during a previous data frame (i.e., the HARQ feedback message may include HARQ feedback information for one or more of the data subframes received during the previous data frame). An example transmission of a group HARQ feedback message 545 for a plurality of data subframes 530, 531, 532, 533 is described with reference to FIG. 5.

In some cases, the plurality of data subframes for which the group HARQ feedback message is transmitted may include a subset of the received set of one or more data subframes (i.e., the group HARQ feedback message may include HARQ feedback information for the subset of the set of one or more data subframes). In these cases, the HARQ feedback module 764 may also transmit a next group HARQ feedback message for a remaining subset of the received set of one or more data subframes. The next group HARQ feedback message may be transmitted over the unlicensed spectrum during a next transmission period. The next transmission period may in some cases be during a next data frame. The remaining subset of data subframes for which the next group HARQ feedback message is transmitted may include a remaining subset of the received set of one or more data subframes (e.g., those data subframes for which HARQ feedback information was not included in the HARQ feedback message transmitted during the current transmission period or data frame). Optionally, the next group HARQ feedback message may also include HARQ feedback information for one or more data subframes received during the next transmission period (e.g., during the next data frame).

The data subframes received by the DL synchronous HARQ module 863 may be decoded, and the data subframes that are correctly decoded may be identified. The group HARQ feedback message transmitted by the HARQ feedback module 864 (and if transmitted, the next group HARQ feedback message) may include an acknowledgment for each of the data subframes correctly decoded. The group HARQ feedback message transmitted by the HARQ feedback module 864 (and if transmitted, the next group HARQ feedback message) may also include a non-acknowledgement for each data subframe not decoded (or not correctly decoded). Additionally or alternately, the group HARQ feedback message transmitted by the HARQ feedback module 864 (and if transmitted, the next group HARQ feedback message) may include a process identifier for each data subframe correctly decoded.

In some embodiments, one or both of CSI feedback and an SRS may be transmitted by the HARQ feedback module 864, over the unlicensed spectrum, concurrently with a group HARQ feedback message and/or a next group HARQ feedback message.

The DL asynchronous HARQ module 865 may be used in an asynchronous mode of operation between the device 855 and an eNB. In such a mode, the DL asynchronous HARQ module 865 may receive a set of one or more data subframes of a data frame over an unlicensed spectrum. The set of one or more data subframes may be received during a transmission period (e.g., a transmission period of the data frame), and may be received via the unlicensed spectrum module 816 of the receiver module 812. In some embodiments, the set of one or more data subframes of a data frame may be received during a downlink portion of the transmission period. An example reception of a set of one or more data subframes 630, 631, 632, 633, 634 of a data frame 605 is described with reference to FIG. 6.

When operating in the asynchronous mode of operation between the device 855 and an eNB, the UL grants module 867 may receive an uplink grant over the unlicensed spectrum. The uplink grant may be received after the transmission period (e.g., during a next transmission period of a next data frame), and may be received via the LTE frame sequence number module 716 of the receiver module 712. An example reception of an uplink grant 650 is described with reference to FIG. 6.

Also when operating in the asynchronous mode of operation between the device 855 and an eNB, the HARQ feedback module 866 may transmit a group HARQ feedback message for a plurality of data subframes. The group HARQ feedback message may be transmitted over the unlicensed spectrum in response to the uplink grant, and may be transmitted via the unlicensed spectrum module 836 of the transmitter module 832. The plurality of data subframes for which the group HARQ feedback message is transmitted may include at least one of the data subframes in the received set of one or more data subframes (e.g., one of the data subframes in the set of one or more data subframes; two or more of the data subframes in the set of one or more data subframes; or all of the data subframes in the set of one or more data subframes). Optionally, the plurality of data subframes for which the group HARQ feedback message is transmitted may also or alternately include one or more data subframes received during a previous data frame (i.e., the HARQ feedback message may include HARQ feedback information for one or more of the data subframes received during the previous data frame). An example transmission of a group HARQ feedback message 670 for a plurality of data subframes 630, 631, 632, 633, 634 is described with reference to FIG. 6.

The uplink grant and/or group HARQ feedback message may in some cases be received by the UL grants module 867, or transmitted by the HARQ feedback module 866, during a next data frame.

The data subframes received by the DL asynchronous HARQ module 865 may be decoded, and the data subframes that are correctly decoded may be identified. The group HARQ feedback message transmitted by the HARQ feedback module 866 may include an acknowledgment for each of the data subframes correctly decoded. The group HARQ feedback message transmitted by the HARQ feedback module 866 may also include a non-acknowledgement for each data subframe not decoded (or not correctly decoded). Additionally or alternately, the group HARQ feedback message transmitted by the HARQ feedback module 866 may include a process identifier for each data subframe correctly decoded.

In some embodiments, one or both of CSI feedback and an SRS may be transmitted by the HARQ feedback module 866, over the unlicensed spectrum from the UE, concurrently with the group HARQ feedback message.

In some cases, the previous data frame, data frame, and/or next data frame in which the eNB LTE HARQ module 860 transmits and/or receives control signals or data may be temporally adjacent data frames (i.e., not separated by other data frames transmitted over the unlicensed spectrum). In other cases, one or more other data frames may be transmitted over the unlicensed spectrum between the previous data frame, data frame, and/or next data frame. The other data frames may in some cases be transmitted by one or more devices other than the device 855, and may occur because the device 855 fails to perform a successful CCA for the other data frames (and therefore cannot gain access to the unlicensed spectrum during the other data frames).

Figure 9:
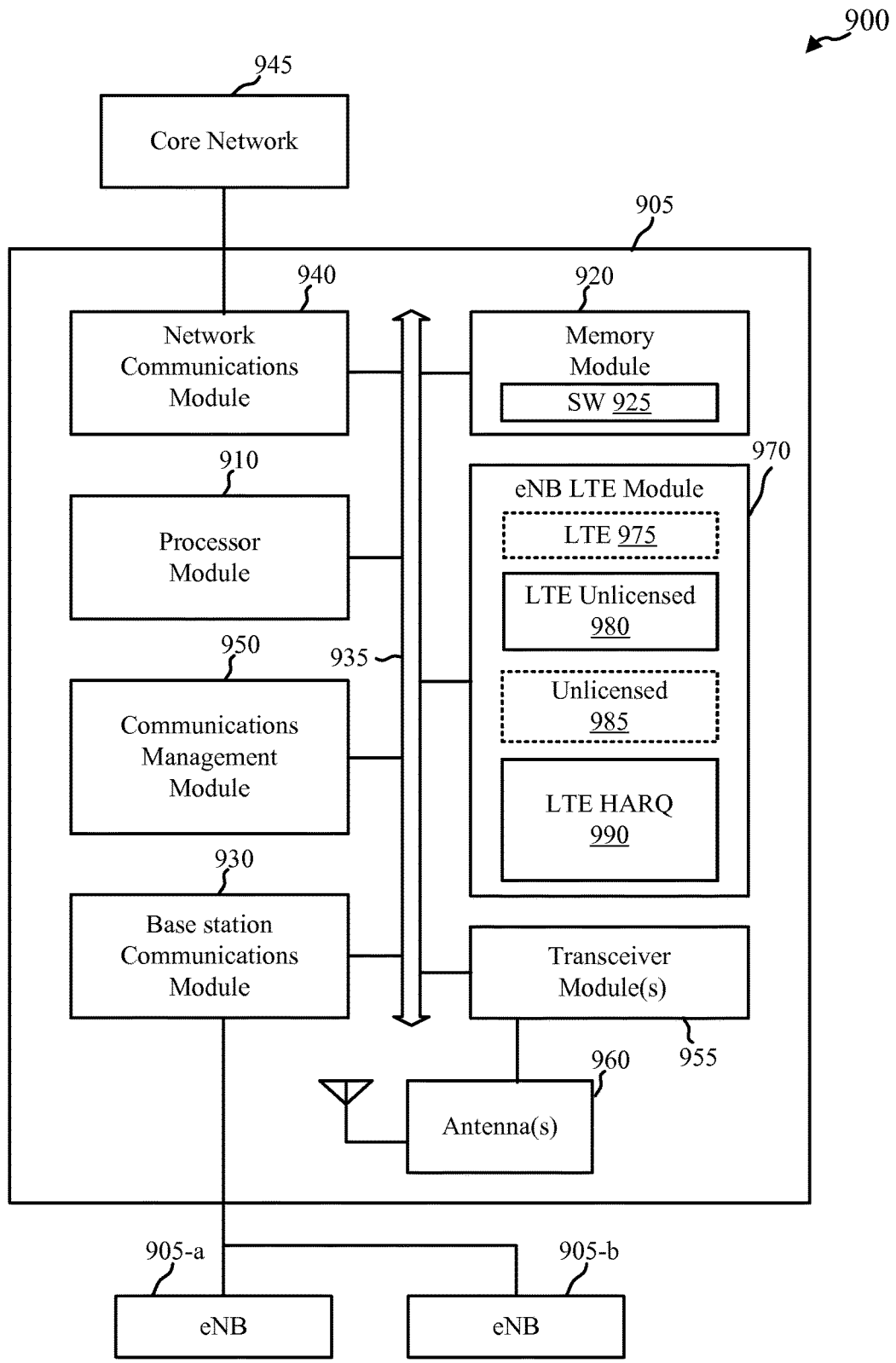
FIG. 9 shows a block diagram that illustrates an example of an eNB architecture according to various embodiments.

Turning to FIG. 9, a block diagram 900 is shown that illustrates an eNB 905 configured for LTE/LTE-A in an unlicensed or shared spectrum. In some embodiments, the eNB 905 may be an example of one or more aspects of the eNBs or devices 105, 205, 705, and/or 755 described with reference to FIGS. 1, 2A, 2B, 7A, and/or 7B. The eNB 905 may be configured to implement at least some of the eNB LTE/LTE-A in an unlicensed or shared spectrum features and functions described with reference to FIGS. 1, 2A, 2B, 4, 5, 6, 7A, and/or 7B. The eNB 905 may include a processor module 910, a memory module 920, at least one transceiver module (represented by transceiver module(s) 955), at least one antenna (represented by antenna(s) 960), and/or an eNB LTE module 970. The eNB 905 may also include one or both of a base station communications module 930 and a network communications module 940. Each of these components may be in communication with each other, directly or indirectly, over one or more buses 935.

The memory module 920 may include random access memory (RAM) and/or read-only memory (ROM). The memory module 920 may store computer-readable, computer-executable software (SW) code 925 containing instructions that are configured to, when executed, cause the processor module 910 to perform various functions described herein for using LTE-based communications in a licensed and/or unlicensed spectrum, including, for example 1) the transmission of one or more data frames including a plurality of data subframes, to a UE, over the unlicensed spectrum, and 2) the synchronous or asynchronous reception of one or more group HARQ feedback messages form the UE. Alternatively, the software code 925 may not be directly executable by the processor module 910 but be configured to cause the eNB 905, e.g., when compiled and executed, to perform various of the functions described herein.

The processor module 910 may include an intelligent hardware device, e.g., a central processing unit (CPU), a microcontroller, an ASIC, etc. The processor module 910 may process information received through the transceiver module(s) 955, the base station communications module 930, and/or the network communications module 940. The processor module 910 may also process information to be sent to the transceiver module(s) 955 for transmission through the antenna(s) 960, to the base station communications module 930 for transmission to one or more other base stations or eNBs 905-*a* and 905-*b*, and/or to the network communications module 940 for transmission to a core network 945, which may be an example of aspects of the core network 130 described with reference to FIG. 1. The processor module 910 may handle, alone or in connection with the eNB LTE module 970, various aspects of using LTE-based communications in a licensed and/or unlicensed spectrum, including, for example 1) the transmission of one or more data frames including a plurality of data subframes, to a UE, over the unlicensed spectrum, and 2) the synchronous or asynchronous reception of one or more group HARQ feedback messages form the UE.

The transceiver module(s) 955 may include a modem configured to modulate the packets and provide the modulated packets to the antenna(s) 960 for transmission, and to demodulate packets received from the antenna(s) 960. The transceiver module(s) 955 may be implemented as one or more transmitter modules and one or more separate receiver modules. The transceiver module(s) 955 may support communications in a licensed spectrum (e.g., an LTE spectrum) and/or an unlicensed spectrum. The transceiver module(s) 955 may be configured to communicate bi-directionally, via the antenna(s) 960, with one or more of the UEs or devices 115, 215, 815, and/or 855 described with reference to FIGS. 1, 2A, 2B, 8A, and/or 8B, for example. The eNB 905 may typically include multiple antennas 960 (e.g., an antenna array). The eNB 905 may communicate with the core network 945 through the network communications module 940. The eNB 905 may communicate with other base stations or eNBs, such as the eNBs 905-*a* and 905-*b*, using the base station communications module 930.

According to the architecture of FIG. 9, the eNB 905 may further include a communications management module 950. The communications management module 950 may manage communications with other base stations, eNBs, and/or devices. The communications management module 950 may be in communication with some or all of the other components of the eNB 905 via the bus or buses 935. Alternatively, functionality of the communications management module 950 may be implemented as a component of the transceiver module(s) 955, as a computer program product, and/or as one or more controller elements of the processor module 910.

The eNB LTE module 970 may be configured to perform and/or control some or all of the features and/or functions described with reference to FIGS. 1, 2A, 2B, 4, 5, 6, 7A, 7B, 8A, and/or 8B related to using LTE-based communications in a licensed and/or unlicensed spectrum. For example, the eNB LTE module 970 may be configured to support a supplemental downlink mode, a carrier aggregation mode, and/or a standalone mode. The eNB LTE module 970 may include an LTE module 975 configured to handle LTE communications, an LTE unlicensed module 980 configured to handle LTE/LTE-A in an unlicensed or shared spectrum communications (including the performance of CCA for an unlicensed spectrum), and/or an unlicensed module 985 configured to handle communications other than LTE/LTE-A in an unlicensed or shared spectrum. The LTE module 975 and/or the unlicensed module 985 may be optional (as shown by the dashed lines) when the eNB 905 operates typically in LTE over an unlicensed spectrum. The eNB LTE module 970 may also include an LTE HARQ module 990 configured to perform, for example, any of the eNB LTE HARQ functions described with reference to FIGS. 1, 4, 5, 6, 7A, and/or 7B. The LTE HARQ module 990 may be an example of similar modules (e.g., LTE frame sequence number module 720 and/or eNB LTE HARQ module 760) described with reference to FIGS. 7A and/or 7B. The eNB LTE module 970, or portions of it, may include a processor, and/or some or all of the functionality of the eNB LTE module 970 may be performed by the processor module 910 and/or in connection with the processor module 910.

Figure 10:
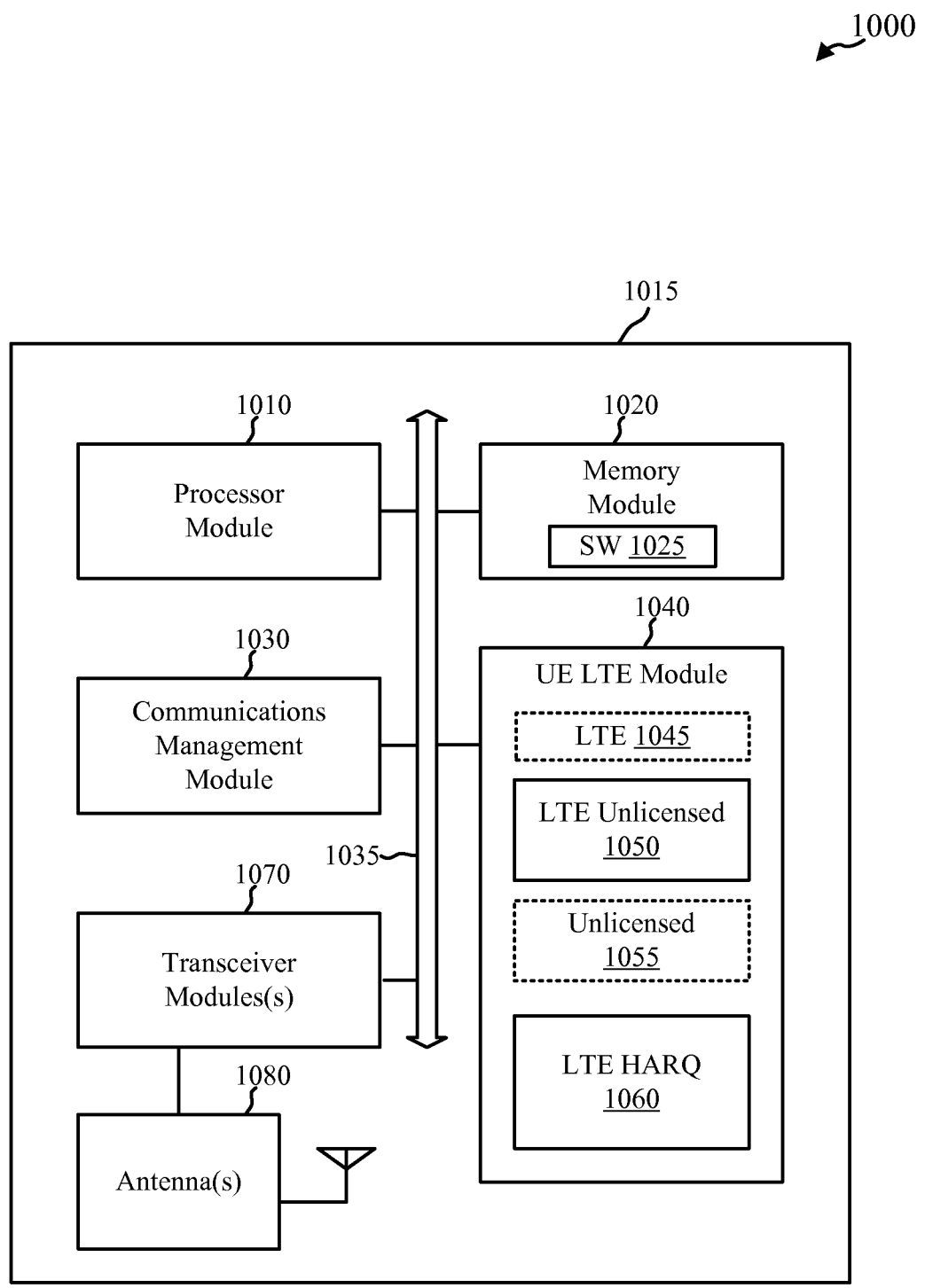
FIG. 10 shows a block diagram that illustrates an example of a UE architecture according to various embodiments.

Turning to FIG. 10, a block diagram 1000 is shown that illustrates a UE 1015 configured for LTE/LTE-A in an unlicensed or shared spectrum. The UE 1015 may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 1015 may have an internal power supply (not shown), such as a small battery, to facilitate mobile operation. In some embodiments, the UE 1015 may be an example of one or more of the UEs or devices 115, 215, 815, and/or 855 described with reference to FIGS. 1, 2A, 2B, 8A, and/or 8B. The UE 1015 may be configured to communicate with one or more of the eNBs or devices 105, 205, 705, 755, and/or 905 described with reference to FIGS. 1, 2A, 2B, 7A, 7B, and/or 9.

The UE 1015 may include a processor module 1010, a memory module 1020, at least one transceiver module (represented by transceiver module(s) 1070), at least one antenna (represented by antenna(s) 1080), and/or a UE LTE module 1040. Each of these components may be in communication with each other, directly or indirectly, over one or more buses 1035.

The memory module 1020 may include RAM and/or ROM. The memory module 1020 may store computer-readable, computer-executable software (SW) code 1025 containing instructions that are configured to, when executed, cause the processor module 1010 to perform various functions described herein for using LTE-based communications in a licensed and/or unlicensed spectrum, including, for example 1) the reception of one or more data frames including a plurality of data subframes over the unlicensed spectrum, and 2) the synchronous or asynchronous transmission of one or more group HARQ feedback messages (e.g., to an eNB). Alternatively, the software code 1025 may not be directly executable by the processor module 1010 but be configured to cause the UE 1015 (e.g., when compiled and executed) to perform various of the UE functions described herein.

The processor module 1010 may include an intelligent hardware device, e.g., a CPU, a microcontroller, an ASIC, etc. The processor module 1010 may process information received through the transceiver module(s) 1070 and/or information to be sent to the transceiver module(s) 1070 for transmission through the antenna(s) 1080. The processor module 1010 may handle, alone or in connection with the UE LTE module 1040, various aspects of using LTE-based communications in a licensed and/or unlicensed spectrum, including, for example 1) the reception of one or more data frames including a plurality of data subframes over the unlicensed spectrum, and 2) the synchronous or asynchronous transmission of one or more group HARQ feedback messages (e.g., to an eNB).

The transceiver module(s) 1070 may be configured to communicate bi-directionally with eNBs. The transceiver module(s) 1070 may be implemented as one or more transmitter modules and one or more separate receiver modules. The transceiver module(s) 1070 may support communications in at least one licensed spectrum (e.g., an LTE spectrum) and in at least one unlicensed spectrum. The transceiver module(s) 1070 may include a modem configured to modulate the packets and provide the modulated packets to the antenna(s) 1080 for transmission, and to demodulate packets received from the antenna(s) 1080. While the UE 1015 may include a single antenna, there may be embodiments in which the UE 1015 may include multiple antennas 1080.

According to the architecture of FIG. 10, the UE 1015 may further include a communications management module 1030. The communications management module 1030 may manage communications with various base stations or eNBs. The communications management module 1030 may be a component of the UE 1015 in communication with some or all of the other components of the UE 1015 over the one or more buses 1035. Alternatively, functionality of the communications management module 1030 may be implemented as a component of the transceiver module(s) 1070, as a computer program product, and/or as one or more controller elements of the processor module 1010.

The UE LTE module 1040 may be configured to perform and/or control some or all of the features and/or functions described with reference to FIGS. 1, 2A, 2B, 4, 5, 6, 7A. 7B, 8A, and/or 8B related to using LTE-based communications in a licensed and/or unlicensed spectrum. For example, the UE LTE module 1040 may be configured to support a supplemental downlink mode, a carrier aggregation mode, and/or a standalone mode. The UE LTE module 1040 may include an LTE module 1045 configured to handle LTE communications, an LTE unlicensed module 1050 configured to handle LTE/LTE-A in an unlicensed or shared spectrum communications, and/or an unlicensed module 1055 configured to handle communications other than LTE/LTE-A in an unlicensed or shared spectrum. The LTE module 1045 and/or the unlicensed module 1055 may be optional (as shown by the dashed lines) when the UE 1015 operates typically in LTE over an unlicensed spectrum. The UE LTE module 1040 may also include an LTE HARQ module 1060 configured to perform, for example, any of the UE LTE HARQ functions described with reference to FIGS. 1, 4, 5, 6, 8A, and/or 8B. The LTE HARQ module 1060 may be an example of similar modules (e.g., module 820 and/or module 860) described with reference to FIGS. 8A and/or 8B. The UE LTE module 1040, or portions of it, may include a processor, and/or some or all of the functionality of the UE LTE module 1040 may be performed by the processor module 1010 and/or in connection with the processor module 1010.

Figure 11:
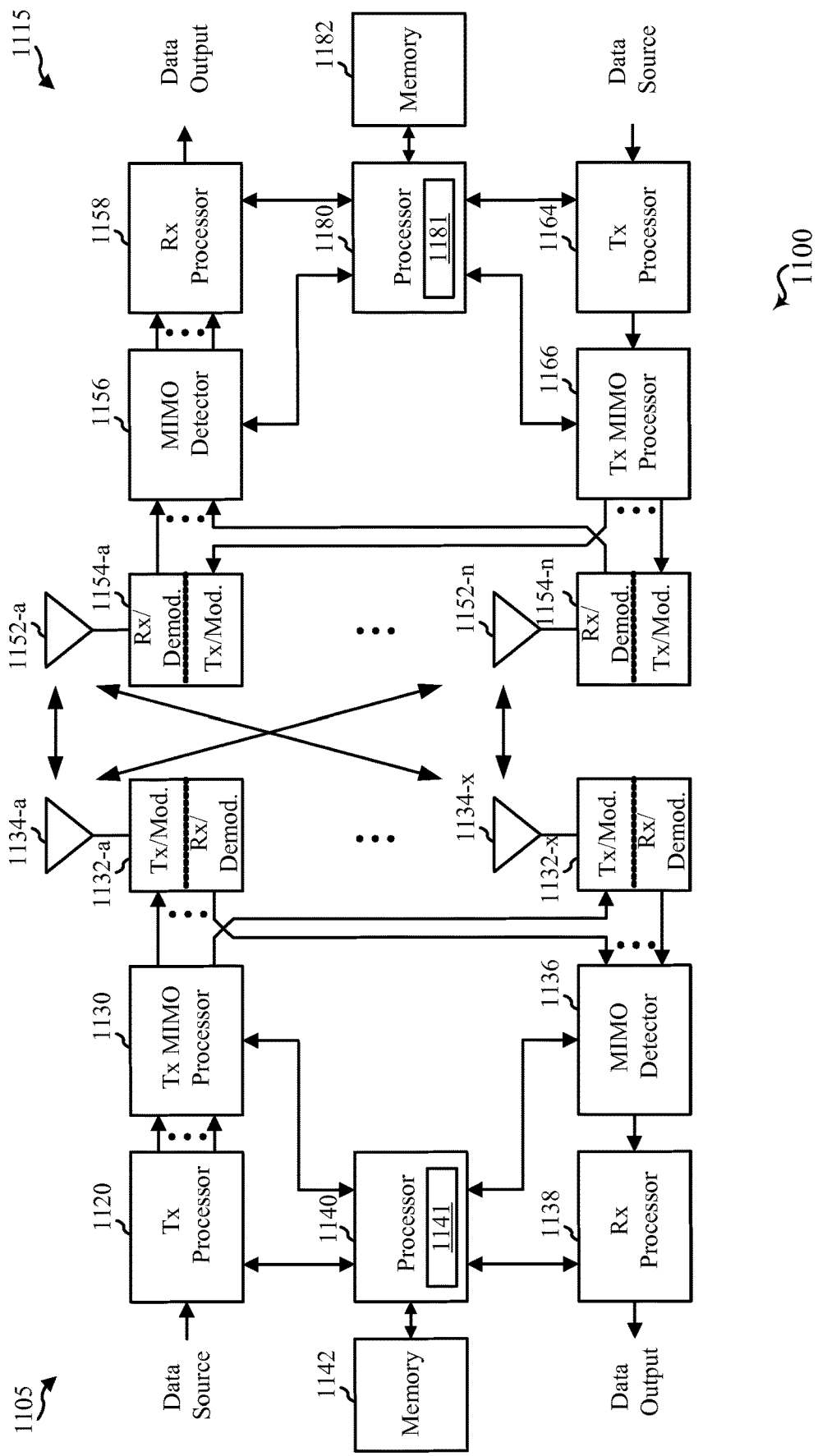
FIG. 11 shows a block diagram that illustrates an example of a multiple-input multiple-output (MIMO) communications system according to various embodiments.

Turning next to FIG. 11, a block diagram of a multiple-input multiple-output (MIMO) communication system 1100 is shown including an eNB 1105 and a UE 1115. The eNB 1105 and the UE 1115 may support LTE-based communications using a licensed and/or unlicensed spectrum. The eNB 1105 may be an example of one or more aspects of the eNBs or devices 105, 205, 705, 755, and/or 905 described with reference to FIGS. 1, 2A, 2B, 7A, 7B, and/or 9, while the UE 1115 may be an example of one or more aspects of the UEs or devices 115, 215, 815, 855, and/or 1015 described with reference to FIGS. 1, 2A, 2B, 8A, 8B, and/or 10. The system 1100 may illustrate aspects of the wireless communications system 100, 200, and/or 250 described with reference to FIGS. 1, 2A, and/or 2B.

The eNB 1105 may be equipped with antennas 1134-*a* through 1134-*x*, and the UE 1115 may be equipped with antennas 1152-*a* through 1152-*n*. In the system 1100, the eNB 1105 may be able to send data over multiple communication links at the same time. Each communication link may be called a "layer" and the "rank" of the communication link may indicate the number of layers used for communication. For example, in a 2×2 MIMO system where eNB 1105 transmits two "layers," the rank of the communication link between the eNB 1105 and the UE 1115 may be two.

At the eNB 1105, a transmit (Tx) processor 1120 may receive data from a data source. The transmit processor 1120 may process the data. The transmit processor 1120 may also generate reference symbols and/or a cell-specific reference signal. A transmit (Tx) MIMO processor 1130 may perform spatial processing (e.g., precoding) on data symbols, control symbols, and/or reference symbols, if applicable, and may provide output symbol streams to the transmit (Tx) modulator/demodulators 1132-*a* through 1132-*x*. Each modulator/demodulator 1132 may process a respective output symbol stream (e.g., for OFDM, etc.) to obtain an output sample stream. Each modulator/demodulator 1132 may further process (e.g., convert to analog, amplify, filter, and upconvert) the output sample stream to obtain a downlink (DL) signal. In one example, DL signals from modulator/demodulators 1132-*a* through 1132-*x* may be transmitted via the antennas 1134-*a* through 1134-*x*, respectively.

At the UE 1115, the antennas 1152-*a* through 1152-*n* may receive the DL signals from the eNB 1105 and may provide the received signals to the receive (Rx) modulator/demodulators 1154-*a* through 1154-*n*, respectively. Each modulator/demodulator 1154 may condition (e.g., filter, amplify, downconvert, and digitize) a respective received signal to obtain input samples. Each modulator/demodulator 1154 may further process the input samples (e.g., for OFDM, etc.) to obtain received symbols. A MIMO detector 1156 may obtain received symbols from all the modulator/demodulators 1154-*a* through 1154-*n*, perform MIMO detection on the received symbols if applicable, and provide detected symbols. A receive (Rx) processor 1158 may process (e.g., demodulate, deinterleave, and decode) the detected symbols, providing decoded data for the UE 1115 to a data output, and provide decoded control information to a processor 1180, or memory 1182. The processor 1180 may include a module or function 1181 that may perform various functions related to using LTE-based communications in a licensed and/or unlicensed spectrum. For example, the module or function 1181 may perform some or all of the functions of the LTE HARQ module 820, 860, and/or 1060 described with reference to FIGS. 8A, 8B, and/or 10, the CCA module 861 described with reference to FIG. 8B, and/or the UE LTE module 1040 described with reference to FIG. 10.

On the uplink (UL), at the UE 1115, a transmit (Tx) processor 1164 may receive and process data from a data source. The transmit processor 1164 may also generate reference symbols for a reference signal. The symbols from the transmit processor 1164 may be precoded by a transmit (Tx) MIMO processor 1166 if applicable, further processed by the transmit (Tx) modulator/demodulators 1154-*a* through 1154-*n* (e.g., for SC-FDMA, etc.), and be transmitted to the eNB 1105 in accordance with the transmission parameters received from the eNB 1105. At the eNB 1105, the UL signals from the UE 1115 may be received by the antennas 1134, processed by the receiver (Rx) modulator/demodulators 1132, detected by a MIMO detector 1136 if applicable, and further processed by a receive (Rx) processor 1138. The receive processor 1138 may provide decoded data to a data output and to the processor 1140. The processor 1140 may include a module or function 1141 that may perform various aspects related to using LTE-based communications in a licensed and/or unlicensed spectrum. For example, the module or function 1141 may perform some or all of the functions of the LTE HARQ module 720, 760, and/or 990 described with reference to FIGS. 7A, 7B, and/or 9, the CCA module 761 described with reference to FIG. 7B, and/or the eNB LTE module 970 described with reference to FIG. 9.

The components of the eNB 1105 may, individually or collectively, be implemented with one or more ASICs adapted to perform some or all of the applicable functions in hardware. Each of the noted modules may be a means for performing one or more functions related to operation of the system 1100. Similarly, the components of the UE 1115 may, individually or collectively, be implemented with one or more ASICs adapted to perform some or all of the applicable functions in hardware. Each of the noted components may be a means for performing one or more functions related to operation of the system 1100.

Figure 12:
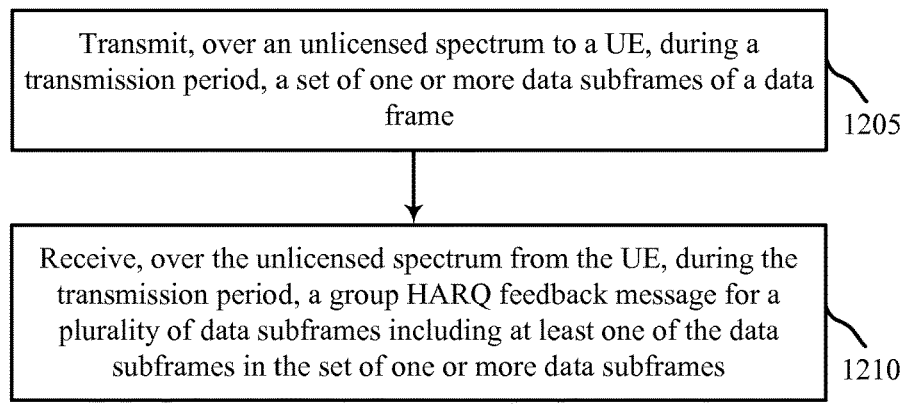
FIGS. 12 and 13 are flowcharts of examples of methods for wireless communications using unlicensed spectrum in a synchronous mode of operation (e.g., from an eNB perspective) according to various embodiments.

FIG. 12 is a flow chart illustrating an example of a method 1200 for wireless communications. For clarity, the method 1200 is described below with reference to one of the eNBs or devices 105, 205, 705, 755, 905, and/or 1105 described with reference to FIGS. 1, 2A, 2B, 7A, 7B, 9, and/or 11 and one of the UEs or devices 115, 215, 815, 855, 1015, and/or 1115 described with reference to FIGS. 1, 2A, 2B, 8A, 8B, 9, and/or 11. In one embodiment, an eNB may execute one or more sets of codes to control the functional elements of the eNB to perform the functions described below.

At block 1205, a set of one or more data subframes of a data frame may be transmitted over an unlicensed spectrum to a UE. The set of one or more data subframes may be transmitted during a transmission period (e.g., a transmission period of the data frame). An example transmission of a set of one or more data subframes 530, 531, 532, 533, 534 of a data frame 505 is described with reference to FIG. 5. The operation(s) at block 1205 may in some cases be performed using the eNB LTE HARQ module 720, 760, and/or 990 described with reference to FIGS. 7A, 7B, and/or 9, the DL synchronous HARQ module 763 described with reference to FIG. 7B, and/or the module or function 1141 described with reference to FIG. 11.

At block 1210, a group HARQ feedback message may be received for a plurality of data subframes. The group HARQ feedback message may be received over the unlicensed spectrum, from the UE, during the transmission period. The plurality of data subframes for which the group HARQ feedback message is received may include at least one of the data subframes in the set of one or more data subframes transmitted at block 1205 (e.g., one of the data subframes in the set of one or more data subframes; two or more of the data subframes in the set of one or more data subframes; or all of the data subframes in the set of one or more data subframes). Optionally, the plurality of data subframes for which the group HARQ feedback message is received may also or alternately include one or more data subframes transmitted during a previous data frame (i.e., the HARQ feedback message may include HARQ feedback information for one or more of the data subframes transmitted during the previous data frame). In some examples, the group HARQ feedback message may be received either periodically or in response to a trigger. An example reception of a group HARQ feedback message 545 for a plurality of data subframes 530, 531, 532, 533 is described with reference to FIG. 5.

In some cases, the group HARQ feedback message may include an acknowledgment for each of a number of data subframes decoded by the UE. The group HARQ feedback message may also include a non-acknowledgement for each of a number of data subframes that were not decoded (or not correctly decoded) by the UE.

In some cases, the group HARQ feedback message may include a process identifier for each of a plurality of data subframes being acknowledged by the UE in the group HARQ feedback message.

The operation(s) at block 1210 may in some cases be performed using the eNB LTE HARQ module 720, 760, and/or 990 described with reference to FIGS. 7A, 7B, and/or 9, the HARQ feedback module 764 described with reference to FIG. 7B, and/or the module or function 1141 described with reference to FIG. 11.

In some embodiments, the set of one or more data subframes of a data frame transmitted at block 1205 may be transmitted during a downlink portion of the transmission period. Also, and in some cases, the group HARQ feedback message received at block 1210 may be received after the downlink portion of the transmission period.

In some embodiments, CCA may be performed to determine availability of the unlicensed spectrum, and the unlicensed spectrum may be accessed during the data frame (e.g., for transmitting the set of one or more data subframes at block 1205) when a determination is made that the unlicensed spectrum is available. Another CCA may be performed to determine availability of the unlicensed spectrum during the next data frame, and so on.

In some embodiments, an RTS message may be transmitted over the unlicensed spectrum to the UE. The RTS message may be transmitted after performing CCA, and may signal to the UE that the UE also needs to perform CCA. Upon successfully performing CCA, the UE may reserve the unlicensed spectrum for transmission of the group HARQ feedback message. The UE may also transmit a CTS message over the unlicensed spectrum. The CTS message may be received from the UE (e.g., by an eNB performing the method 1200) and may cause the eNB to reserve an uplink portion of the transmission period to receive the group HARQ feedback message from the UE.

In some embodiments, one or both of CSI feedback and an SRS may be received over the unlicensed spectrum from the UE concurrently with the group HARQ feedback message.

In some cases, the previous data frame, data frame, and/or next data frame may be temporally adjacent data frames (i.e., not separated by other data frames transmitted over the unlicensed spectrum). In other cases, one or more other data frames may be transmitted over the unlicensed spectrum between the previous data frame, data frame, and/or next data frame. The other data frames may in some cases be transmitted by one or more devices other than an eNB performing the method 1200, and may occur because the eNB performing the method 1200 fails to perform a successful CCA for the other data frames (and therefore cannot gain access to the unlicensed spectrum during the other data frames).

Thus, the method 1200 may provide for wireless communications. It should be noted that the method 1200 is just one implementation and that the operations of the method 1200 may be rearranged or otherwise modified such that other implementations are possible.

Figure 13:
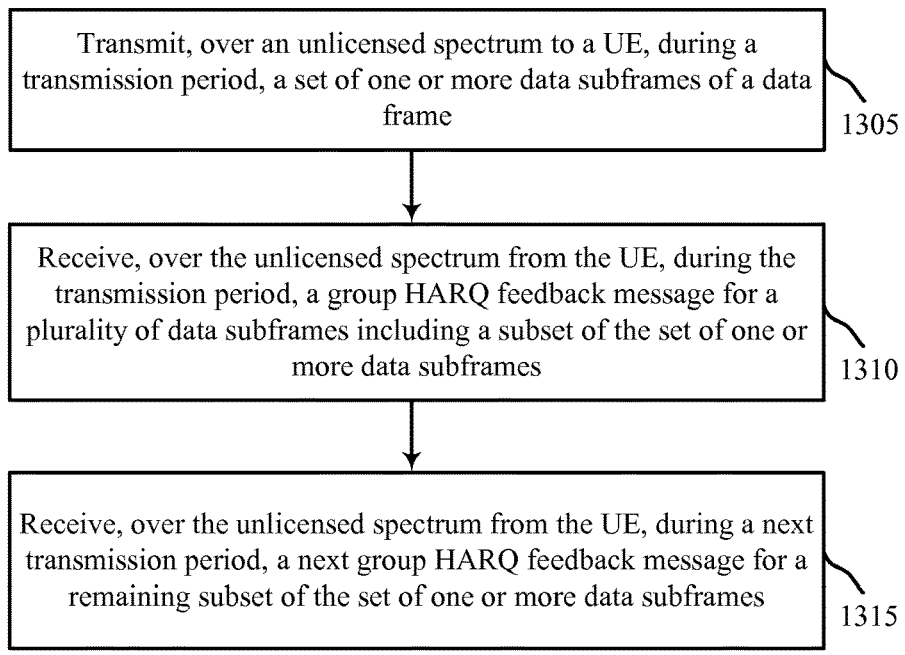

FIG. 13 is a flow chart illustrating an example of a method 1300 for wireless communications. For clarity, the method 1300 is described below with reference to one of the eNBs or devices 105, 205, 705, 755, 905, and/or 1105 described with reference to FIGS. 1, 2A, 2B, 7A, 7B, 9, and/or 11 and one of the UEs or devices 115, 215, 815, 855, 1015, and/or 1115 described with reference to FIGS. 1, 2A, 2B, 8A, 8B, 10, and/or 11. In one embodiment, an eNB may execute one or more sets of codes to control the functional elements of the eNB to perform the functions described below.

At block 1305, a set of one or more data subframes of a data frame may be transmitted over an unlicensed spectrum to a UE. The set of one or more data subframes may be transmitted during a transmission period (e.g., a transmission period of the data frame). An example transmission of a set of one or more data subframes 530, 531, 532, 533, 534 of a data frame 505 is described with reference to FIG. 5. The operation(s) at block 1305 may in some cases be performed using the eNB LTE HARQ module 720, 760, and/or 990 described with reference to FIGS. 7A, 7B, and/or 9, the DL synchronous HARQ module 763 described with reference to FIG. 7B, and/or the module or function 1141 described with reference to FIG. 11.

At block 1310, a group HARQ feedback message may be received for a plurality of data subframes. The group HARQ feedback message may be received over the unlicensed spectrum, from the UE, during the transmission period. The plurality of data subframes for which the group HARQ feedback message is received may include a subset of the set of one or more data subframes transmitted at block 1305 (i.e., the group HARQ feedback message may include HARQ feedback information for the subset of the set of one or more data subframes). Optionally, the plurality of data subframes for which the group HARQ feedback message is received may also or alternately include one or more data subframes transmitted during a previous data frame (i.e., the group HARQ feedback message may include HARQ feedback information for one or more of the data subframes transmitted during the previous data frame). An example reception of a group HARQ feedback message 545 for a subset of a set of data subframes 530, 531, 532, 533 is described with reference to FIG. 5.

At block 1315, a next group HARQ feedback message may be received for a remaining subset of the set of one or more data subframes transmitted at block 1305. The next group HARQ feedback message may be received over the unlicensed spectrum, from the UE, during a next transmission period. The next transmission period may in some cases be during a next data frame. The remaining subset of data subframes for which the next group HARQ feedback message is received may include a remaining subset of the set of one or more data subframes transmitted at block 1205 (e.g., those data subframes for which HARQ feedback information was not included in the HARQ feedback message received at block 1310). Optionally, the next group HARQ feedback message may also include HARQ feedback information for one or more data subframes transmitted during the next transmission period (e.g., during the next data frame).

In some cases, each of the group HARQ feedback message and the next group HARQ feedback message may include an acknowledgment for each of a number of data subframes decoded by the UE. Each of the group HARQ feedback message and the next group HARQ feedback message may also include a non-acknowledgement for each of a number of data subframes that were not decoded (or not correctly decoded) by the UE.

In some cases, each of the group HARQ feedback message and the next group HARQ feedback message may include a process identifier for each of a plurality of data subframes being acknowledged by the UE.

The operation(s) at block 1310 may in some cases be performed using the eNB LTE HARQ module 720, 760, and/or 990 described with reference to FIGS. 7A, 7B, and/or 9, the HARQ feedback module 764 described with reference to FIG. 7B, and/or the module or function 1141 described with reference to FIG. 11.

In some embodiments, the set of one or more data subframes of a data frame transmitted at block 1305 may be transmitted during a downlink portion of the transmission period. Also, and in some cases, the group HARQ feedback message received at block 1310 may be received after the downlink portion of the transmission period.

In some embodiments, CCA may be performed to determine availability of the unlicensed spectrum, and the unlicensed spectrum may be accessed during the data frame (e.g., for transmitting the set of one or more data subframes at block 1305) when a determination is made that the unlicensed spectrum is available. Another CCA may be performed to determine availability of the unlicensed spectrum during the next data frame, and so on.

In some embodiments, an RTS message may be transmitted over the unlicensed spectrum to the UE. The RTS message may be transmitted after performing CCA, and may signal to the UE that the UE also needs to perform CCA. Upon successfully performing CCA, the UE may reserve the unlicensed spectrum for transmission of the group HARQ feedback message. The UE may also transmit a CTS message over the unlicensed spectrum. The CTS message may be received from the UE (e.g., by an eNB performing the method 1300) and may cause the eNB to reserve an uplink portion of the transmission period to receive the group HARQ feedback message from the UE. Another round of RTS/CTS messages may be sent/received during the next data frame, and may cause the eNB to reserve an uplink portion of the next transmission period to receive the next group HARQ feedback message from the UE.

In some embodiments, one or both of CSI feedback and an SRS may be received over the unlicensed spectrum from the UE concurrently with the group HARQ feedback message and/or the next group HARQ feedback message.

In some cases, the previous data frame, data frame, and/or next data frame may be temporally adjacent data frames (i.e., not separated by other data frames transmitted over the unlicensed spectrum). In other cases, one or more other data frames may be transmitted over the unlicensed spectrum between the previous data frame, data frame, and/or next data frame. The other data frames may in some cases be transmitted by one or more devices other than an eNB performing the method 1300, and may occur because the eNB performing the method 1300 fails to perform a successful CCA for the other data frames (and therefore cannot gain access to the unlicensed spectrum during the other data frames).

Thus, the method 1300 may provide for wireless communications. It should be noted that the method 1300 is just one implementation and that the operations of the method 1300 may be rearranged or otherwise modified such that other implementations are possible.

Figure 14:
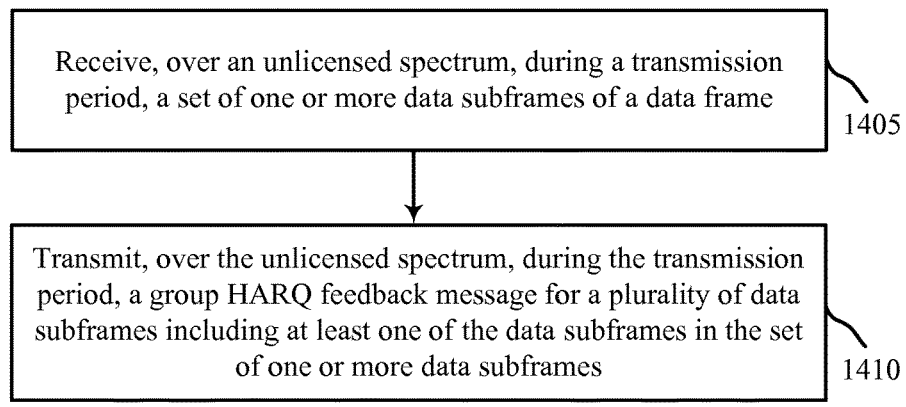
FIG. 14 is a flowchart of an example of a method for wireless communications using unlicensed spectrum in a synchronous mode of operation (e.g., from a UE perspective) according to various embodiments.

FIG. 14 is a flow chart illustrating an example of a method 1400 for wireless communications. For clarity, the method 1400 is described below with reference to one of the UEs or devices 115, 215, 815, 855, 1015, and/or 1115 described with reference to FIGS. 1, 2A, 2B, 8A, 8B, 10, and/or 11 and one of the eNBs or devices 105, 205, 705, 755, 905, and/or 1105 described with reference to FIGS. 1, 2A, 2B, 7A, 7B, 9, and/or 11. In one embodiment, a UE may execute one or more sets of codes to control the functional elements of the UE to perform the functions described below.

At block 1405, a set of one or more data subframes of a data frame may be received over an unlicensed spectrum during a transmission period (e.g., a transmission period of the data frame). An example reception of a set of one or more data subframes 530, 531, 532, 533, 534 of a data frame 505 by a UE is described with reference to FIG. 5. The operation(s) at block 1405 may in some cases be performed using the UE LTE HARQ module 820, 860, and/or 1060 described with reference to FIGS. 8A, 8B, and/or 10, the DL synchronous HARQ module 863 described with reference to FIG. 8B, and/or the module or function 1181 described with reference to FIG. 11.

At block 1410, a group HARQ feedback message may be transmitted for a plurality of data subframes. The group HARQ feedback message may be transmitted over the unlicensed spectrum during the transmission period. The plurality of data subframes for which the group HARQ feedback message is transmitted may include at least one of the data subframes in the set of one or more data subframes received at block 1405 (e.g., one of the data subframes in the set of one or more data subframes; two or more of the data subframes in the set of one or more data subframes; or all of the data subframes in the set of one or more data subframes). Optionally, the plurality of data subframes for which the group HARQ feedback message is transmitted may also or alternately include one or more data subframes received during a previous data frame (i.e., the HARQ feedback message may include HARQ feedback information for one or more of the data subframes received during the previous data frame). An example transmission of a group HARQ feedback message 545 for a plurality of data subframes 530, 531, 532, 533 is described with reference to FIG. 5.

The operation(s) at block 1410 may in some cases be performed using the UE LTE HARQ module 820, 860, and/or 1060 described with reference to FIGS. 8A, 8B, and/or 10, the HARQ feedback module 864 described with reference to FIG. 8B, and/or the module or function 1181 described with reference to FIG. 11.

In some embodiments, the set of one or more data subframes of a data frame received at block 1405 may be received during a downlink portion of the transmission period. Also, and in some cases, the group HARQ feedback message transmitted at block 1410 may be transmitted after the downlink portion of the transmission period.

In some embodiments, the plurality of data subframes for which the group HARQ feedback message is transmitted, at block 1410, may include a subset of the set of one or more data subframes received at block 1405 (i.e., the group HARQ feedback message may include HARQ feedback information for the subset of the set of one or more data subframes). Optionally, the plurality of data subframes for which the group HARQ feedback message is transmitted may also or alternately include one or more data subframes received during a previous data frame (i.e., the group HARQ feedback message may include HARQ feedback information for one or more of the data subframes received during the previous data frame). In these embodiments, a next group HARQ feedback message may be transmitted for a remaining subset of the set of one or more data subframes transmitted at block 1405. The next group HARQ feedback message may be transmitted over the unlicensed spectrum during a next transmission period. The next transmission period may in some cases be during a next data frame. The remaining subset of data subframes for which the next group HARQ feedback message is transmitted may include a remaining subset of the set of one or more data subframes received at block 1405 (e.g., those data subframes for which HARQ feedback information was not included in the HARQ feedback message transmitted during the current transmission period). Optionally, the next group HARQ feedback message may also include HARQ feedback information for one or more data subframes received during the next transmission period (e.g., during the next data frame).

The received data subframes may be decoded, and the data subframes that are correctly decoded after reception may be identified. The group HARQ feedback message (and if transmitted, the next group HARQ feedback message) may include an acknowledgment for each of the data subframes correctly decoded. The group HARQ feedback message (and if transmitted, the next group HARQ feedback message) may also include a non-acknowledgement for each data subframe not decoded (or not correctly decoded). Additionally or alternatively, the group HARQ feedback message (and if transmitted, the next group HARQ feedback message) may include a process identifier for each data subframe correctly decoded.

In some embodiments, CCA may be performed to determine availability of the unlicensed spectrum, and the unlicensed spectrum may be accessed during the data frame (e.g., for transmitting the group HARQ feedback message at block 1410) when a determination is made that the unlicensed spectrum is available. The CCA may be performed in response to receiving, over the unlicensed spectrum, an RTS message. Upon successfully performing CCA, a CTS message may be transmitted over the unlicensed spectrum. The CTS message may be transmitted (e.g., to an eNB) to reserve an uplink portion of the transmission period to transmit the group HARQ feedback message. Subsequently, another CCA may be performed to determine availability of the unlicensed spectrum during the next data frame, and so on.

In some embodiments, one or both of CSI feedback and an SRS may be transmitted over the unlicensed spectrum concurrently with the group HARQ feedback message and/or the next group HARQ feedback message.

In some cases, the previous data frame, data frame, and/or next data frame may be temporally adjacent data frames (i.e., not separated by other data frames transmitted over the unlicensed spectrum). In other cases, one or more other data frames may be transmitted over the unlicensed spectrum between the previous data frame, data frame, and/or next data frame. The other data frames may in some cases be transmitted by one or more devices other than a UE performing the method 1400, and may occur because the UE performing the method 1400, and/or an eNB with which the UE is communicating, fails to perform a successful CCA for the other data frames (and therefore cannot gain access to the unlicensed spectrum during the other data frames).

Thus, the method 1400 may provide for wireless communications. It should be noted that the method 1400 is just one implementation and that the operations of the method 1400 may be rearranged or otherwise modified such that other implementations are possible.

Figure 15:
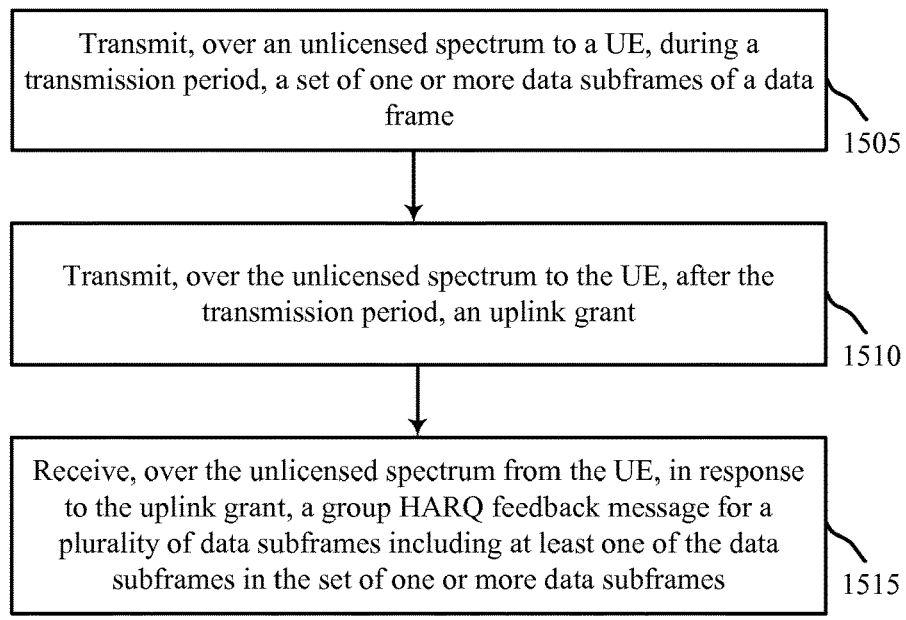
FIG. 15 is a flowchart of an example of a method for wireless communications using unlicensed spectrum in an asynchronous mode of operation (e.g., from an eNB perspective) according to various embodiments.

FIG. 15 is a flow chart illustrating an example of a method 1500 for wireless communications. For clarity, the method 1500 is described below with reference to one of the eNBs or devices 105, 205, 705, 755, 905, and/or 1105 described with reference to FIGS. 1, 2A, 2B, 7A, 7B, 9, and/or 11 and one of the UEs or devices 115, 215, 815, 855, 1015, and/or 1115 described with reference to FIGS. 1, 2A, 2B, 8A, 8B, 10, and/or 11. In one embodiment, an eNB may execute one or more sets of codes to control the functional elements of the eNB to perform the functions described below.

At block 1505, a set of one or more data subframes of a data frame may be transmitted to a UE over an unlicensed spectrum during a transmission period (e.g., a transmission period of the data frame). An example transmission of a set of one or more data subframes 630, 631, 632, 633, 634 of a data frame 605 is described with reference to FIG. 6. The operation(s) at block 1505 may in some cases be performed using the eNB LTE HARQ module 720, 760, and/or 990 described with reference to FIGS. 7A, 7B, and/or 9, the DL asynchronous HARQ module 765 described with reference to FIG. 7B, and/or the module or function 1141 described with reference to FIG. 11.

At block 1510, an uplink grant may be transmitted over the unlicensed spectrum to the UE. The uplink grant may be transmitted after the transmission period (e.g., during a next transmission period of a next data frame). An example transmission of an uplink grant 650 is described with reference to FIG. 6. The operation(s) at block 1510 may in some cases be performed using the eNB LTE HARQ module 720, 760, and/or 990 described with reference to FIGS. 7A, 7B, and/or 9, the UL grants module 767 described with reference to FIG. 7B, and/or the module or function 1141 described with reference to FIG. 11.

At block 1515, a group HARQ feedback message may be received for a plurality of data subframes. The group HARQ feedback message may be received over the unlicensed spectrum in response to the uplink grant. The plurality of data subframes for which the group HARQ feedback message is received may include at least one of the data subframes in the set of one or more data subframes transmitted at block 1505 (e.g., one of the data subframes in the set of one or more data subframes; two or more of the data subframes in the set of one or more data subframes; or all of the data subframes in the set of one or more data subframes). Optionally, the plurality of data subframes for which the group HARQ feedback message is received may also or alternately include one or more data subframes transmitted during a previous data frame (i.e., the HARQ feedback message may include HARQ feedback information for one or more of the data subframes transmitted during the previous data frame). An example reception of a group HARQ feedback message 670 for a plurality of data subframes 630, 631, 632, 633, 634 is described with reference to FIG. 6.

In some cases, the group HARQ feedback message may include an acknowledgment for each of a number of data subframes decoded by the UE. The group HARQ feedback message may also include a non-acknowledgement for each of a number of data subframes that were not decoded (or not correctly decoded) by the UE.

In some cases, the group HARQ feedback message may include a process identifier for each of a plurality of data subframes being acknowledged by the UE in the group HARQ feedback message.

The operation(s) at block 1515 may in some cases be performed using the eNB LTE HARQ module 720, 760, and/or 990 described with reference to FIGS. 7A, 7B, and/or 9, the HARQ feedback module 766 described with reference to FIG. 7B, and/or the module or function 1141 described with reference to FIG. 11.

In some embodiments, the set of one or more data subframes of a data frame transmitted at block 1505 may be transmitted during a downlink portion of the transmission period. Also, and in some cases, the uplink grant and/or group HARQ feedback message may be transmitted (or received) during a next data frame.

In some embodiments, CCA may be performed to determine availability of the unlicensed spectrum, and the unlicensed spectrum may be accessed during the data frame (e.g., for transmitting the set of one or more data subframes at block 1505) when a determination is made that the unlicensed spectrum is available. Another CCA may be performed to determine availability of the unlicensed spectrum during the next data frame, and so on.

In some embodiments, one or both of CSI feedback and an SRS may be received over the unlicensed spectrum from the UE concurrently with the group HARQ feedback message.

In some cases, the previous data frame, data frame, and/or next data frame may be temporally adjacent data frames (i.e., not separated by other data frames transmitted over the unlicensed spectrum). In other cases, one or more other data frames may be transmitted over the unlicensed spectrum between the previous data frame, data frame, and/or next data frame. The other data frames may in some cases be transmitted by one or more devices other than an eNB performing the method 1500, and may occur because the eNB performing the method 1500 fails to perform a successful CCA for the other data frames (and therefore cannot gain access to the unlicensed spectrum during the other data frames).

Thus, the method 1500 may provide for wireless communications. It should be noted that the method 1500 is just one implementation and that the operations of the method 1500 may be rearranged or otherwise modified such that other implementations are possible.

Figure 16:
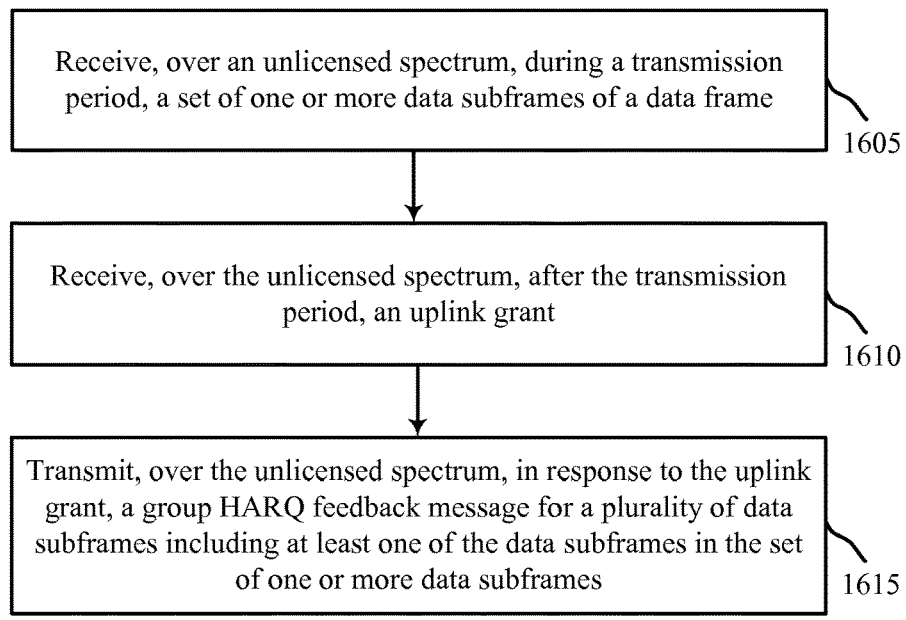
FIG. 16 is a flowchart of an example of a method for wireless communications using unlicensed spectrum in an asynchronous mode of operation (e.g., from a UE perspective).

FIG. 16 is a flow chart illustrating an example of a method 1600 for wireless communications. For clarity, the method 1600 is described below with reference to one of the UEs or devices 115, 215, 815, 855, 1015, and/or 1115 described with reference to FIGS. 1, 2A, 2B, 8A, 8B, 10, and/or 11 and one of the eNBs or devices 105, 205, 705, 755, 905, and/or 1105 described with reference to FIGS. 1, 2A, 2B, 7A, 7B, 9, and/or 11. In one embodiment, a UE may execute one or more sets of codes to control the functional elements of the UE to perform the functions described below.

At block 1605, a set of one or more data subframes of a data frame may be received over an unlicensed spectrum during a transmission period (e.g., a transmission period of the data frame). An example reception of a set of one or more data subframes 630, 631, 632, 633, 634 of a data frame 605 is described with reference to FIG. 6. The operation(s) at block 1605 may in some cases be performed using the UE LTE HARQ module 820, 860, and/or 1060 described with reference to FIGS. 8A, 8B, and/or 10, the DL asynchronous HARQ module 865 described with reference to FIG. 8B, and/or the module or function 1181 described with reference to FIG. 11.

At block 1610, an uplink grant may be received over the unlicensed spectrum. The uplink grant may be received after the transmission period (e.g., during a next transmission period of a next data frame). An example reception of an uplink grant 650 is described with reference to FIG. 6. The operation(s) at block 1610 may in some cases be performed using the UE LTE HARQ module 820, 860, and/or 1060 described with reference to FIGS. 8A, 8B, and/or 10, the UL grants module 867 described with reference to FIG. 8B, and/or the module or function 1181 described with reference to FIG. 11.

At block 1615, a group HARQ feedback message may be transmitted for a plurality of data subframes. The group HARQ feedback message may be transmitted over the unlicensed spectrum in response to the uplink grant. The plurality of data subframes for which the group HARQ feedback message is transmitted may include at least one of the data subframes in the set of one or more data subframes received at block 1605 (e.g., one of the data subframes in the set of one or more data subframes; two or more of the data subframes in the set of one or more data subframes; or all of the data subframes in the set of one or more data subframes). Optionally, the plurality of data subframes for which the group HARQ feedback message is transmitted may also or alternately include one or more data subframes received during a previous data frame (i.e., the HARQ feedback message may include HARQ feedback information for one or more of the data subframes received during the previous data frame). An example transmission of a group HARQ feedback message 670 for a plurality of data subframes 630, 631, 632, 633, 634 is described with reference to FIG. 6.

The operation(s) at block 1615 may in some cases be performed using the UE LTE HARQ module 820, 860, and/or 1060 described with reference to FIGS. 8A, 8B, and/or 10, the HARQ feedback module 866 described with reference to FIG. 7B, and/or the module or function 1181 described with reference to FIG. 11.

In some embodiments, the set of one or more data subframes of a data frame received at block 1605 may be received during a downlink portion of the transmission period. Also, and in some cases, the uplink grant and/or group HARQ feedback message may be received (or transmitted) during a next data frame.

The received data subframes may be decoded, and the data subframes that are correctly decoded after reception may be identified. The group HARQ feedback message may include an acknowledgment for each of the data subframes correctly decoded. The group HARQ feedback message may also include a non-acknowledgement for each data subframe not decoded (or not correctly decoded). Additionally or alternately, the group HARQ feedback message may include a process identifier for each data subframe correctly decoded.

In some embodiments, CCA may be performed in response to the uplink grant to determine availability of the unlicensed spectrum. The unlicensed spectrum may be accessed during the data frame (e.g., for transmitting the group HARQ feedback message at block 1615) when a determination is made that the unlicensed spectrum is available.

In some embodiments, one or both of CSI feedback and an SRS may be transmitted over the unlicensed spectrum concurrently with the group HARQ feedback message.

In some cases, the previous data frame, data frame, and/or next data frame may be temporally adjacent data frames (i.e., not separated by other data frames transmitted over the unlicensed spectrum). In other cases, one or more other data frames may be transmitted over the unlicensed spectrum between the previous data frame, data frame, and/or next data frame. The other data frames may in some cases be transmitted by one or more devices other than an eNB performing the method 1600, and may occur because the eNB performing the method 1600 fails to perform a successful CCA for the other data frames (and therefore cannot gain access to the unlicensed spectrum during the other data frames).

Thus, the method 1600 may provide for wireless communications. It should be noted that the method 1600 is just one implementation and that the operations of the method 1600 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications at a network device, comprising:
   identifying a transmission period that is synchronized with a radio frame interval for communications over a first spectrum, the transmission period comprising a fixed set of subframes for communications over a second spectrum with a user equipment (UE), the second spectrum associated with a contention-based protocol to gain access to the second spectrum, the transmission period comprising a downlink portion and an uplink portion subsequent to the downlink portion, the uplink portion comprising at least a last subframe of the transmission period, and the uplink portion spanning a same set of frequency resources as the downlink portion;
   transmitting, over the second spectrum to the UE, during the downlink portion of the transmission period, data via a set of data subframes of the downlink portion, wherein the set of data subframes comprises a contiguous set of two or more data subframes designated for downlink communication;
   transmitting, over the second spectrum to the UE subsequent to the data via the set of data subframes of the downlink portion, an uplink grant to the UE; and
   receiving, over the second spectrum from the UE, during a subframe of an uplink portion of a subsequent transmission period, a group hybrid automatic repeat request (HARQ) feedback message for data associated with the contiguous set of two or more data subframes, the group HARQ feedback message being responsive to the uplink grant.

2. The method of claim 1, wherein the group HARQ feedback message comprises an acknowledgment for each of the set of data subframes decoded by the UE, the group HARQ feedback message received either periodically or in response to a trigger.

3. The method of claim 1, wherein the group HARQ feedback message comprises a bitmap that indicates, based on a position in the bitmap, a process identifier for each of the set of data subframes being acknowledged by the UE in the group HARQ feedback message.

4. The method of claim 1, further comprising:
   transmitting, over the second spectrum to the UE, a Request to Send message; and
   receiving, over the second spectrum from the UE, a Clear to Send message to reserve the uplink portion of the transmission period to receive the group HARQ feedback message from the UE.

5. The method of claim 1 further comprising:
   receiving, over the second spectrum from the UE, a next group HARQ feedback message comprising HARQ feedback information for a remaining subset of the contiguous set of two or more data subframes, the next group HARQ feedback message being received during a next transmission period.

6. The method of claim 1, further comprising:
   performing clear channel assessment (CCA) to determine availability of the second spectrum; and
   accessing the second spectrum during the transmission period when a determination is made that the second spectrum is available.

7. The method of claim 1, further comprising:
   transmitting a clear to send (CTS) signal when the second spectrum is available for transmission.

8. An apparatus for wireless communications at a network device, comprising:
   a processor; and
   memory communicatively coupled to the processor; wherein the processor is configured to:
   identify a transmission period that is synchronized with a radio frame interval for communications over a first spectrum, the transmission period comprising a fixed set of subframes for communications over a second spectrum with a user equipment (UE), the second spectrum associated with a contention-based protocol to gain access to the second spectrum, the transmission period comprising a downlink portion and an uplink portion subsequent to the downlink portion, the uplink portion comprising at least a last subframe of the transmission period, and the uplink portion spanning a same set of frequency resources as the downlink portion;
   transmit, over the second spectrum to the UE, during the downlink portion of the transmission period, data via a set of data subframes of the downlink portion, wherein the set of data subframes comprises a contiguous set of two or more data subframes designated for downlink communication;
   transmit, over the second spectrum to the UE subsequent to the data via the set of data subframes of the downlink portion, an uplink grant to the UE; and
   receive, over the second spectrum from the UE, during a subframe of an uplink portion of a subsequent transmission period, a group hybrid automatic repeat request (HARQ) feedback message for data associated with the contiguous set of two or more data subframes, the group HARQ feedback message being responsive to the uplink grant.

9. The apparatus of claim 8, wherein the group HARQ feedback message comprises an acknowledgment for each of the set of data subframes decoded by the UE, the group HARQ feedback message received either periodically or in response to a trigger.

10. The apparatus of claim 8, wherein the group HARQ feedback message comprises a bitmap that indicates, based on a position in the bitmap, a process identifier for each of the set of data subframes being acknowledged by the UE in the group HARQ feedback message.

11. The apparatus of claim 8, wherein the processor is further configured to:
   transmit, over the second spectrum to the UE, a Request to Send message; and
   receive, over the second spectrum from the UE, a Clear to Send message to reserve the uplink portion of the transmission period to receive the group HARQ feedback message from the UE.

12. The apparatus of claim 8 wherein the processor is further configured to:
   receive, over the second spectrum from the UE, a next group HARQ feedback message comprising HARQ feedback information for a remaining subset of the contiguous set of two or more data subframes, the next group HARQ feedback message being received during a next transmission period.

13. The apparatus of claim 8, wherein the processor is further configured to:
perform clear channel assessment (CCA) to determine availability of the second spectrum; and
access the second spectrum during the transmission period when a determination is made that the second spectrum is available.

14. The apparatus of claim 8, wherein the processor is further configured to:
transmit a clear to send (CTS) signal when the second spectrum is available for transmission.

15. A method for wireless communications at a user equipment (UE), comprising:
identifying a transmission period that is synchronized with a radio frame interval for communications over a first spectrum, the transmission period comprising a fixed set of subframes for communications over a second spectrum with a network device, the second spectrum associated with a contention-based protocol to gain access to the second spectrum, the transmission period comprising a downlink portion and an uplink portion subsequent to the downlink portion, the uplink portion comprising at least a last subframe of the transmission period, and the uplink portion spanning a same set of frequency resources as the downlink portion;
receiving, over the second spectrum and during the downlink portion of the transmission period, data via a set of data subframes of the downlink portion, wherein the set of data subframes comprises a contiguous set of two or more data subframes designated for downlink communication;
receiving, over the second spectrum subsequent to the data via the set of data subframes of the downlink portion, an uplink grant; and
transmitting, over the second spectrum responsive to the uplink grant, during a subframe of an uplink portion of a subsequent transmission period, a group hybrid automatic repeat request (HARQ) feedback message for data associated with the contiguous set of two or more data subframes.

16. The method of claim 15, further comprising identifying which data subframes are correctly decoded after reception, the group HARQ feedback message comprising an acknowledgement for each of the set of data subframes correctly decoded, and wherein the group HARQ feedback message is transmitted, over the second spectrum either periodically or in response to a trigger.

17. The method of claim 15, further comprising identifying which data subframes are correctly decoded after reception, the group HARQ feedback message comprising a bitmap that indicates, based on a position in the bitmap, a process identifier for each of the set of data subframes correctly decoded.

18. The method of claim 15, further comprising:
receiving, over the second spectrum, a Request to Send message; and
transmitting, over the second spectrum, a Clear to Send message to reserve the uplink portion of the transmission period to transmit the group HARQ feedback message.

19. The method of claim 15, further comprising:
transmitting, over the second spectrum, a next group HARQ feedback message comprising HARQ feedback information for a remaining subset of the contiguous set of two or more data subframes, the next group HARQ feedback message being transmitted during a next transmission period.

20. An apparatus for wireless communications at a user equipment (UE), comprising:
a processor; and
memory communicatively coupled to the processor; wherein the processor is configured to:
identify a transmission period that is synchronized with a radio frame interval for communications over a first spectrum, the transmission period comprising a fixed set of subframes for communications over a second spectrum with a network device, the second spectrum associated with a contention-based protocol to gain access to the second spectrum, the transmission period comprising a downlink portion and an uplink portion subsequent to the downlink portion, the uplink portion comprising at least a last subframe of the transmission period, and the uplink portion spanning a same set of frequency resources as the downlink portion;
receive, over the second spectrum and during the downlink portion of the transmission period, data via a set of data subframes of the downlink portion, wherein the set of data subframes comprises a contiguous set of two or more data subframes designated for downlink communication;
receive, over the second spectrum subsequent to the data via the set of data subframes of the downlink portion, an uplink grant; and
transmit, over the second spectrum responsive to the uplink grant, during a subframe of an uplink portion of a subsequent transmission period, a group hybrid automatic repeat request (HARQ) feedback message for data associated with the contiguous set of two or more data subframes.

21. The apparatus of claim 20, wherein the processor is further configured to identify which data subframes are correctly decoded after reception, the group HARQ feedback message comprising an acknowledgement for each of the set of data subframes correctly decoded, and wherein the group HARQ feedback message is transmitted, over the second spectrum either periodically or in response to a trigger.

22. The apparatus of claim 20, wherein the processor is further configured to identify which data subframes are correctly decoded after reception, the group HARQ feedback message comprising a bitmap that indicates, based on a position in the bitmap, a process identifier for each of the set of data subframes correctly decoded.

23. The apparatus of claim 20, wherein the processor is further configured to:
receive, over the second spectrum, a Request to Send message; and
transmit, over the second spectrum, a Clear to Send message to reserve the uplink portion of the transmission period to transmit the group HARQ feedback message.

24. The apparatus of claim 20, wherein the processor is further configured to:
transmit, over the second spectrum, a next group HARQ feedback message comprising HARQ feedback information for a remaining subset of the contiguous set of two or more data subframes, the next group HARQ feedback message being transmitted during a next transmission period.

25. The method of claim 1, wherein the transmission period is synchronized with the radio frame interval such that a frame boundary of the transmission period is offset from a periodic frame boundary of the radio frame interval.

26. The apparatus of claim 8, wherein the transmission period is synchronized with the radio frame interval such that a frame boundary of the transmission period is offset from a periodic frame boundary of the radio frame interval.

27. The method of claim 15, wherein the transmission period is synchronized with the radio frame interval such that a frame boundary of the transmission period is offset from a periodic frame boundary of the radio frame interval.

28. The apparatus of claim 20, wherein the transmission period is synchronized with the radio frame interval such that a frame boundary of the transmission period is offset from a periodic frame boundary of the radio frame interval.

\* \* \* \* \*